(12) United States Patent
Inoue et al.

(10) Patent No.: US 10,247,927 B2
(45) Date of Patent: Apr. 2, 2019

(54) ZOOM LENS, PROJECTION DISPLAY DEVICE, AND IMAGING APPARATUS

(71) Applicant: FUJIFILM Corporation, Tokyo (JP)

(72) Inventors: Kazuki Inoue, Saitama (JP); Yukiko Nagatoshi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/686,260

(22) Filed: Aug. 25, 2017

(65) Prior Publication Data

US 2018/0059389 A1 Mar. 1, 2018

(30) Foreign Application Priority Data

Aug. 30, 2016 (JP) ................................. 2016-168100

(51) Int. Cl.
*G02B 15/167* (2006.01)
*G02B 15/20* (2006.01)
*G02B 13/16* (2006.01)
*G02B 15/177* (2006.01)
*G02B 15/163* (2006.01)

(52) U.S. Cl.
CPC .......... *G02B 15/167* (2013.01); *G02B 13/16* (2013.01); *G02B 15/163* (2013.01); *G02B 15/177* (2013.01); *G02B 15/20* (2013.01)

(58) Field of Classification Search
CPC .. G02B 15/167; G02B 15/163; G02B 15/177; G02B 15/20; G02B 13/009; G02B 13/16; G02B 13/18; G02B 13/22; G03B 21/142

USPC ................................. 359/432, 649, 679, 755
See application file for complete search history.

(56) References Cited

U.S. PATENT DOCUMENTS

| | | | |
|---|---|---|---|
| 7,224,535 B2 | 5/2007 | Neil | |
| 7,227,682 B2 | 6/2007 | Caldwell et al. | |
| 2014/0204351 A1* | 7/2014 | Matsuo | G02B 13/16 353/98 |
| 2015/0234167 A1* | 8/2015 | Ode | G02B 13/16 359/432 |
| 2018/0059519 A1* | 3/2018 | Nagatoshi | G02B 13/009 |

FOREIGN PATENT DOCUMENTS

JP 2014-029392 A 2/2014

* cited by examiner

*Primary Examiner* — Frank G Font
(74) *Attorney, Agent, or Firm* — Studebaker & Brackett PC

(57) ABSTRACT

In the zoom lens, a first optical system is formed on the magnification side, and a second optical system is formed on the reduction side, with the intermediate image formed between the first optical system and the second optical system. The second optical system consists of, in order from the magnification side, a first lens group that has a positive power, a second lens group that has a positive power, a third lens group that has a positive or negative power, and a fourth lens group that has a positive power. During zooming, the second lens group and the third lens group are moved by changing spacings between the groups adjacent to each other in a direction of an optical axis, and the fourth lens group remains stationary with respect to the reduction side imaging plane.

20 Claims, 14 Drawing Sheets

EXAMPLE 1

EXAMPLE 2

EXAMPLE 4

EXAMPLE 5

EXAMPLE 2

EXAMPLE 3

EXAMPLE 4

ZOOM LENS, PROJECTION DISPLAY DEVICE, AND IMAGING APPARATUS

CROSS-REFERENCE TO RELATED APPLICATIONS

The present application claims priority under 35 U.S.C. § 119 to Japanese Patent Application No. 2016-168100, filed on Aug. 30, 2016. The above application is hereby expressly incorporated by reference, in its entirety, into the present application.

BACKGROUND OF THE INVENTION

1. Field of the Invention

The present invention relates to a zoom lens forming an intermediate image, a projection display device comprising the zoom lens, and an imaging apparatus comprising the zoom lens.

2. Description of the Related Art

In the past, projection display devices, each of which projects an image displayed on a light valve such as a liquid crystal display element or a Digital Micromirror Device (DMD: registered trademark) onto a screen or the like in an enlarged manner, have come into widespread use. In recent years, with the improvement in the performance of light valves, it has become necessary to perform favorable aberration correction appropriate for the resolutions of light valves on projection lenses used in combination with light valves. Further, from the viewpoint of installing projection display devices, there is a tendency that a projection lens having a zooming function is preferred.

As an optical system that has a zooming function conventionally known, for example, there are optical systems described in JP2014-29392A, U.S. Pat. Nos. 7,224,535B, and 7,227,682B. JP2014-29392A, U.S. Pat. Nos. 7,224,535B, and 7,227,682B describe an optical system in which an intermediate image is formed inside a lens system and the intermediate image is re-imaged again.

SUMMARY OF THE INVENTION

In recent years, scenes projected onto a large screen in a large hall, exhibition, or the like through a projection display device have been increasing. For these reasons, there has been a strong demand for a zoom lens having a wider angle. In addition, there has also been a demand for a zoom lens having a small F number.

However, in order to cope with the recent demand, the optical systems having zooming functions described in JP2014-29392A and U.S. Pat. No. 7,224,535B have room for improvement in terms of an angle of view, and the optical system described in U.S. Pat. No. 7,227,682B has room for improvement in terms of an angle of view and an F number.

The present invention has been made in consideration of the above-mentioned situations, and its object is to provide a high optical performance zoom lens that has a small F number with a wide angle, a projection display device comprising the zoom lens, and an imaging apparatus comprising the zoom lens.

A zoom lens of the present invention forms an intermediate image at a position conjugate to a reduction side imaging plane and causes the intermediate image to be re-imaged on a magnification side imaging plane. The zoom lens consisting of, in order from the magnification side: a first optical system; and a second optical system. The intermediate image is positioned between the first optical system and the second optical system. The second optical system consists of, in order from the magnification side, a first lens group that has a positive refractive power, a second lens group that has a positive refractive power, a third lens group that has a positive or negative refractive power, and a fourth lens group that has a positive refractive power. In addition, during zooming, the second lens group and the third lens group are moved by changing spacings between the groups adjacent to each other in a direction of an optical axis, and the fourth lens group remains stationary with respect to the reduction side imaging plane.

It is preferable that the zoom lens of the present invention satisfies at least one of the following conditional expressions (1) to (5).

$$0.095 < Y\mathrm{max}/f2 < 0.15 \quad (1)$$

$$1.1 < Y\mathrm{max}/f1 < 2 \quad (2)$$

$$-0.05 < Y\mathrm{max}/fG3 < 0.2 \quad (3)$$

$$1 < \mathrm{Mag}2T/\mathrm{Mag}2W < 1.2 \quad (4)$$

$$0.9 < \mathrm{Mag}3T/\mathrm{Mag}3W < 1.1 \quad (5)$$

Here, Ymax is a maximum image height on the reduction side,
f2 is a focal length of the second optical system at a wide-angle end,
f1 is a focal length of the first optical system at the wide-angle end,
fG3 is a focal length of the third lens group,
Mag2T is a lateral magnification of the second lens group at a telephoto end,
Mag2W is a lateral magnification of the second lens group at the wide-angle end,
Mag3T is a lateral magnification of the third lens group at the telephoto end, and
Mag3W is a lateral magnification of the third lens group at the tide-angle end.

In the zoom lens of the present invention, it is preferable that during focusing, the second optical system remains stationary with respect to the reduction side imaging plane. In such a case, it is preferable that the first optical system consists of, in order from the magnification side, a front group that has a negative refractive power, an intermediate group that has a negative refractive power, and a rear group that has a positive refractive power. In addition, it is preferable that during focusing, the intermediate group is moved by changing spacings between the groups adjacent to each other in the direction of the optical axis.

In the zoom lens of the present invention, it is preferable that during zooming, the first optical system remains stationary with respect to the reduction side imaging plane.

In the zoom lens of the present invention, it is preferable that the first optical system has three or more negative lenses continuously in order from a position closest to the magnification side.

In the zoom lens of the present invention, it is preferable that the first optical system has three cemented lenses in which a positive lens, a negative lens, and a positive lens are cemented in order from the magnification side, and either of the two positive lenses within the three cemented lenses has an Abbe number at a d line larger than that of the negative lens within the three cemented lenses.

In a case where the first optical system has the three cemented lenses, it is preferable that the zoom lens satisfies at least one of the following conditional expressions (6) to (12).

$$25 < \nu 1 - \nu 2 < 55 \quad (6)$$

$$50 < \nu 3 - \nu 2 < 60 \quad (7)$$

$$-0.25 < Y\max/fc < 0.25 \quad (8)$$

$$0.1 < Y\max/fc1 < 0.7 \quad (9)$$

$$-1 < Y\max/fc2 < -0.4 \quad (10)$$

$$0.2 < Y\max/fc3 < 0.45 \quad (11)$$

$$0.3 < Y\max/Rc1 < 0.7 \quad (12)$$

Here, ν1 is an Abbe number of the positive lens on the magnification side within the three cemented lenses at the d line, ν2 is an Abbe number of the negative lens within the three cemented lenses at the d line, ν3 is an Abbe number of the positive lens on the reduction side within the three cemented lenses at the d line, Ymax is a maximum image height on the reduction side, fc is a focal length of the three cemented lenses.

fc1 is a focal length of the positive lens on the magnification side within the three cemented lenses, fc2 is a focal length of the negative lens within the three cemented lenses, fc3 is a focal length of the positive lens on the reduction side within the three cemented lenses, and Rc1 is a radius of curvature of a cemented surface on the reduction side within the three cemented lenses.

A projection display device of the present invention comprises: a light source; a light valve into which light originating from the light source is incident; and the zoom lens of the present invention. The zoom lens projects an optical image, which is formed by light modulated through the light valve, onto a screen.

An imaging apparatus of the present invention comprises the above-mentioned zoom lens of the present invention.

It should be noted that the "magnification side" means a projected side (screen side). Even in a case where projection is performed in a reduced manner, for convenience, the screen side is referred to as the magnification side. On the other hand, the "reduction side" means an original image display region side (light valve side). Even in a case where projection is performed in a reduced manner, for convenience, the light valve side is referred to as the reduction side.

It should be noted that the "consists of . . . " means that the zoom lens may include, substantially, not only the above-mentioned elements but also lenses substantially having no powers, optical elements, which are not lenses, such as a reflection member substantially having no power, a stop, a filter, and/or a cover glass, and the like.

It should be noted that the "lens group" is not necessarily formed of a plurality of lenses, but may be formed of only one lens. Further, signs of refractive powers of the lens groups, signs of refractive powers of the lenses, and radii of curvature of the surfaces are assumed as those in paraxial regions in a case where some lenses have aspheric surfaces unless otherwise noted. Signs of radii of curvature of surfaces convex toward the magnification side are set to be positive, and signs of radii of curvature of surfaces convex toward the reduction side are set to be negative. The values of the conditional expressions are values obtained in a case where the zoom lens is in focus on the magnification side imaging plane at a distance of 1.1 m from the lens surface, which is closest to the magnification side, to the magnification side, and the values are based on the d line (a wavelength of 587.6 nm). All the values of Ymax used in the conditional expressions are positive values.

According to the present invention, in the zoom lens that forms an intermediate image, the second optical system closer to the reduction side than the intermediate image is formed as a zooming optical system having a 4-group configuration, and the movement during zooming and the sign of each lens group are appropriately set. Thus, it is possible to provide a high optical performance zoom lens that has a small F number with a wide angle, a projection display device comprising the zoom lens, and an imaging apparatus comprising the zoom lens.

DESCRIPTION OF THE PREFERRED EMBODIMENTS

Figure 1:
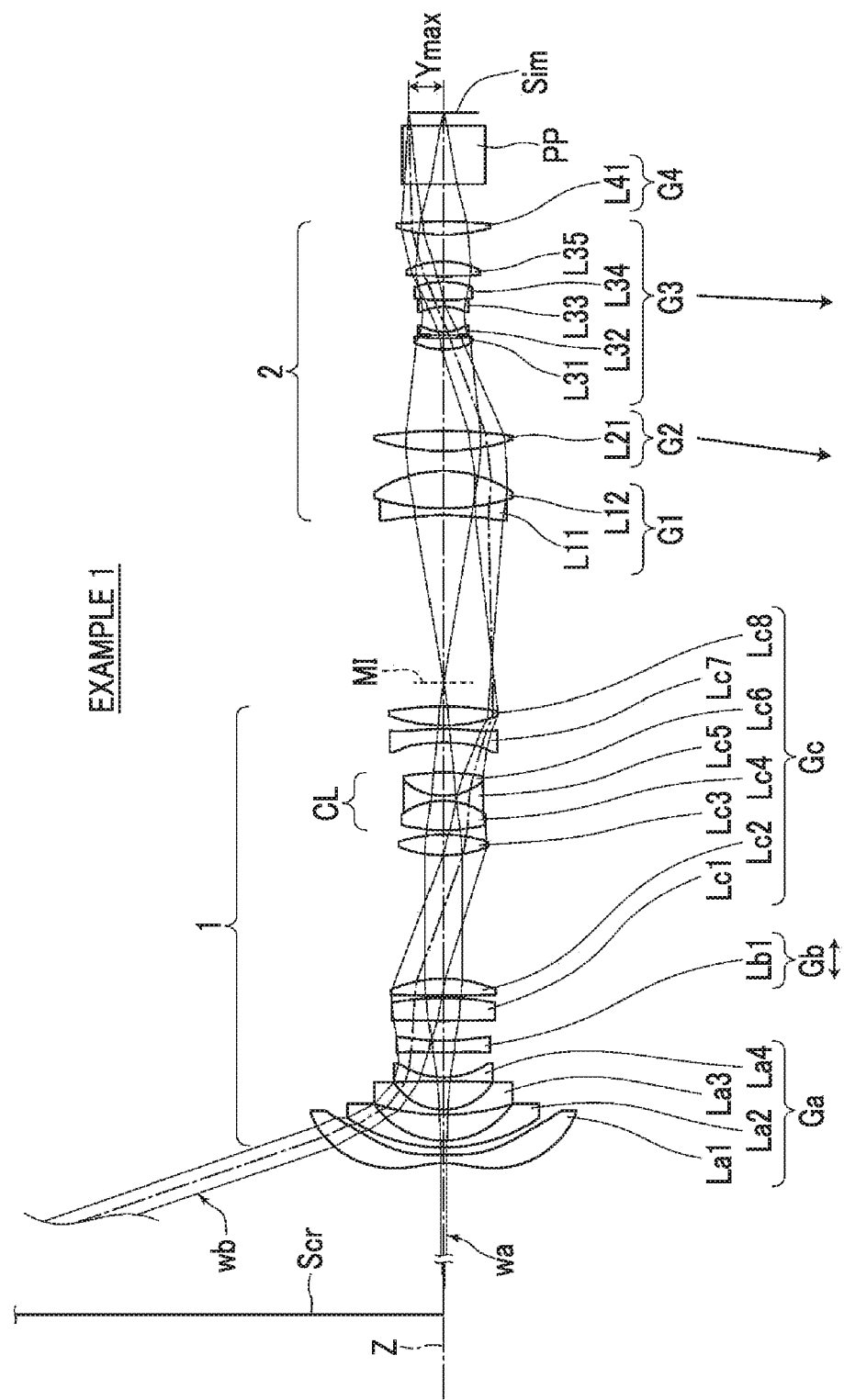
FIG. 1 is a cross-sectional view illustrating a configuration and an optical path of a zoom lens of Example 1 of the present invention.

Hereinafter, embodiments of the present invention will be described with reference to drawings. FIG. 1 is a cross-sectional view illustrating a configuration of a zoom lens at the wide-angle end according to an embodiment of the present invention. The exemplary configuration shown in FIG. 1 corresponds to Example 1 to be described later. In FIG. 1, the left side is the magnification side, and the right side is the reduction side, and on-axis rays wa and rays with the maximum angle of view wb are also shown.

The zoom lens is an optical system that forms an intermediate image at a position conjugate to a reduction side imaging plane and causes the intermediate image to be re-imaged on a magnification side imaging plane. This zoom lens is, for example, mounted on a projection display device, and can be used to project image information displayed on the light valve onto the screen. In FIG. 1, assuming that the zoom lens is mounted on the projection display device, a screen Scr, an optical member PP such as a filter and a prism used in a color synthesizing section or an illumination light separating section, and an image display surface Sim of a light valve positioned on the reduction side of the optical member PP are also shown. In the projection display device, rays, which are made to have image information through the image display surface Sim, are incident into the zoom lens through the optical member PP, and are transmitted onto a screen, which is not shown in the drawing, through the zoom lens. That is, in the example of FIG. 1, the image display surface Sim corresponds to the reduction side imaging plane, and the screen Scr corresponds to the magnification side imaging plane.

It should be noted that, in FIG. 1, for simplification of the drawing, only one image display surface Sim is shown, but the projection display device may be configured such that the rays originating from a light source is separated into rays with three primary colors through a color separation optical system, three light valves for the respective primary colors are arranged, and a full-color image is displayed.

In the zoom lens, a first optical system 1 is formed on the magnification side, and a second optical system 2 is formed on the reduction side, with an intermediate image MI formed therebetween. The second optical system 2 forms the intermediate image MI at a position conjugate to the reduction side imaging plane, and the first optical system 1 causes the intermediate image MI to be re-imaged on the magnification side imaging plane. In addition, in FIG. 1, only a part of the intermediate image MI including the vicinity of the optical axis is indicated by the dotted line.

In a normal optical system that does not form an intermediate image, in a case where a wide angle is intended to be achieved by shortening a focal length thereof, the diameter of the magnification side lens inevitably becomes excessively large. However, in a manner similar to that of the present embodiment, in an optical system that forms an intermediate image MI and further causes the intermediate image MI to be re-imaged on the screen Scr, it is possible to decrease the diameter of the magnification side lens, and the optical system is appropriate to achieve the wide angle by shortening the focal length.

In the zoom lens, the second optical system 2 includes, in order from the magnification side along the optical axis Z, a first lens group G1 that has a positive refractive power, a second lens group G2 that has a positive refractive power, a third lens group G3 that has a positive or negative refractive power, and a fourth lens group G4 that has a positive refractive power. In addition, during zooming, the second lens group G2 and the third lens group G3 are moved by changing spacings between the groups adjacent to each other in a direction of an optical axis, and the fourth lens group G4 remains stationary with respect to the reduction side imaging plane. By moving the second lens group G2 and the third lens group G3 along loci different from each other during zooming, it is possible to suppress deviation in position of the image plane during zooming. By making the fourth lens group G4 stationary during zooming, it becomes easy to ensure telecentricity on the reduction side even during zooming. In contrast, in a manner similar to that of the example shown in FIG. 1, the first lens group G1 may be configured to remain stationary with respect to the reduction side imaging plane during zooming, and may be moved during zooming as shown in examples to be described later.

In FIG. 1, under each of the second lens group G2 and the third lens group G3, a direction of moving each lens group during zooming from the wide-angle end to the telephoto end is schematically indicated by an arrow. The second lens group G2 and the third lens group G3 of the example of FIG. 1 each move to the magnification side during zooming from the wide-angle end to the telephoto end, and the spacing on the optical axis between the second lens group G2 and the third lens group G3 at the telephoto end becomes larger than that at the wide-angle end.

Since each lens group of the second optical system 2 has a refractive power having the above-mentioned sign, the following effects can be obtained. In the optical system that forms an intermediate image, in most cases, a lens group having a strong positive refractive power is disposed to be closest to the magnification side of the second optical system 2. However, in the present embodiment, by dividing the lens group having a strong positive refractive power into two lens groups as the first lens group G1 and the second lens group G2, it is possible to suppress field curvature and lateral chromatic aberration without difficulty. Further, by dividing the second optical system 2 into the four groups, an angle of rays incident into and emitted from the first lens group G1 and the fourth lens group G4 in the second optical system 2 is adjusted, and power is appropriately distributed to the second lens group G2 and the third lens group G3 which greatly contribute to zooming. Thereby, it is possible to perform zooming while suppressing aberrations. Generally, it becomes difficult to correct field curvature and lateral chromatic aberration as the angle of view increases, and it becomes difficult to suppress aberrations during zooming as the F number decreases. However, as described above, according to the zoom lens of the present embodiment, there is an advantage in achieving a wide-angle lens system having a small F number.

In the example shown in FIG. 1, the first lens group G1 includes, in order from the magnification side, two lenses as the lenses L11 and L12, the second lens group G2 includes only one lens as a lens L21, the third lens group G3 includes, in order from the magnification side, five lenses as the lenses L31 to L35, and the fourth lens group G4 includes only one lens as a lens L41. However, each lens group may include lenses of which the number is different from that in the example shown in FIG. 1.

The first optical system 1 may be configured to remain stationary with respect to the reduction side imaging plane during zooming. In the wide-angle lens system, in order to stably ensure performance even during zooming, it is advantageous that the optical path in the first optical system having a function for achieving a wide angle should not change as much as possible during zooming. By adopting a configuration in which the first optical system 1 remains stationary during zooming, even in a case where zooming is performed, an optical path of rays passing the image heights of intermediate images MI is set to not change between the intermediate image MI and the first optical system 1.

In contrast, during focusing, the second optical system 2 may be configured such that all the lens groups thereof remain stationary with respect to the reduction side imaging plane. In such a case, it is possible to suppress change in optical path caused by fluctuation in focusing.

In a case where the second optical system 2 remains stationary during focusing, focusing may be performed by moving a part of the first optical system 1. In the example shown in FIG. 1, the first optical system 1 includes, in order from the magnification side, a front group Ga that has a negative refractive power, an intermediate group Gb that has a negative refractive power, and a rear group Gc that has a positive refractive power. The intermediate group Gb is configured to move by changing spacings between the groups adjacent to each other in the direction of the optical axis during focusing. In such a case, it is possible to decrease fluctuation in angle of view during focusing. It should be noted that both arrows under the intermediate group Gb of FIG. 1 indicate that the intermediate group Gb moves during focusing.

In the example shown in FIG. 1, the front group Ga includes, in order from the magnification side, four lenses as the lenses La1 to La4, the intermediate group Gb includes only one lens of a lens Lb1, and the rear group Gc includes eight lenses as lenses Lc1 to Lc8.

In a manner similar to that of the example shown in FIG. 1, it is preferable that the first optical system 1 has three or more negative lenses continuously in order from a position closest to the magnification side. In such a case, it becomes easy to suppress field curvature.

Further, it is preferable that the first optical system 1 has three cemented lenses CL in which a positive lens, a negative lens, and a positive lens are cemented in order from the magnification side. In addition, it is preferable that an Abbe number of each of the two positive lenses within the three cemented lenses CL at the d line is larger than an Abbe number of the negative lens within the three cemented lenses CL at the d line. By providing such three cemented lenses CL, it is possible to suppress high-order aberrations, and it is possible to decrease an absolute value of a radius of curvature of a cemented surface of the cemented lens. Thus, it is possible to suppress longitudinal chromatic aberration and lateral chromatic aberration. With such a configuration, there is an advantage in realizing a wide-angle lens system that has a small F number.

Next, a configuration relating to the conditional expressions will be described. It is preferable that the zoom lens satisfies any one or an arbitrary combination of the following conditional expressions (1) to (5) and (1-1) to (5-1).

$$0.095 < Y\max/f2 < 0.15 \quad (1)$$

$$0.1 < Y\max/f2 < 0.145 \quad (1\text{-}1)$$

$$1.1 < Y\max/f1 < 2 \quad (2)$$

$$1.2 < Y\max/f1 < 1.9 \quad (2\text{-}1)$$

$$-0.05 < Y\max/fG3 < 0.2 \quad (3)$$

$$-0.03 < Y\max/fG3 < 0.197 \quad (3\text{-}1)$$

$$1 < Mag2T/Mag2W < 1.2 \quad (4)$$

$$1.01 < Mag2T/Mag2W < 1.15 \quad (4\text{-}1)$$

$$0.9 < Mag3T/Mag3W < 1.1 \quad (5)$$

$$0.95 < Mag3T/Mag3W < 1.05 \quad (5\text{-}1)$$

Here, Ymax is a maximum image height on the reduction side, f2 is a focal length of the second optical system 2 at the wide-angle end, f1 is a focal length of the first optical system 1 at the wide-angle end, fG3 is a focal length of the third lens group G3, Mag2T is a lateral magnification of the second lens group G2 at a telephoto end, Mag2W is a lateral magnification of the second lens group G2 at the wide-angle end, Mag3T is a lateral magnification of the third lens group G3 at the telephoto end, and Mag3W is a lateral magnification of the third lens group G3 at the wide-angle end.

By not allowing the result of Conditional Expression (1) to be equal to or less than the lower limit, there is an advantage in minimizing the total length of the lens system. By not allowing the result of Conditional Expression (1) to be equal to or greater than the upper limit, it becomes easy to suppress field curvature. By satisfying Conditional Expression (1-1), it is possible to enhance effects relating to Conditional Expression (1).

By not allowing the result of Conditional Expression (2) to be equal to or less than the lower limit, there is an advantage in minimizing the total length of the lens system. By not allowing the result of Conditional Expression (2) to be equal to or greater than the upper limit, it becomes easy to suppress field curvature. By satisfying Conditional Expression (2-1), it is possible to enhance effects relating to Conditional Expression (2).

By not allowing the result of Conditional Expression (3) to be equal to or less than the lower limit, it becomes easy to suppress fluctuation in aberrations during zooming while suppressing an angle of a principal ray of off-axis rays which are incident onto the reduction side imaging plane. By not allowing the result of Conditional Expression (3) to be equal to or greater than the upper limit, it becomes easy to suppress fluctuation due to zooming at the angle of the principal ray of the off-axis rays which are incident onto the reduction side imaging plane. By satisfying Conditional Expression (3-1), it is possible to enhance effects relating to Conditional Expression (3).

By not allowing the result of Conditional Expression (4) to be equal to or less than the lower limit, it is possible to make the second lens group G2 contribute to zooming. By not allowing the result of Conditional Expression (4) to be equal to or greater than the upper limit, it becomes easy to suppress lateral chromatic aberration and field curvature during zooming. By satisfying Conditional Expression (4-1), it is possible to enhance effects relating to Conditional Expression (4).

By not allowing the result of Conditional Expression (5) to be equal to or less than the lower limit, a load of the refractive power of the second lens group G2 is reduced, and it becomes easy to suppress spherical aberration. By not allowing the result of Conditional Expression (5) to be equal to or greater than the upper limit, it becomes easy to suppress lateral chromatic aberration and field curvature during zooming. By satisfying Conditional Expression (5-1), it is possible to enhance effects relating to Conditional Expression (5).

It is preferable that the three cemented lenses CL preferably included in the above-mentioned first optical system 1 satisfy at least one or an arbitrary combination of the following conditional expressions (6) to (11) and (6-1) to (11-1). In such a case, it becomes easy to suppress longitudinal chromatic aberration and lateral chromatic aberration.

$$25 < \nu1 - \nu2 < 55 \quad (6)$$

$$30 < \nu1 - \nu2 < 50 \quad (6\text{-}1)$$

$$50 < \nu3 - \nu2 < 60 \quad (7)$$

$$52 < \nu3 - \nu2 < 58 \quad (7\text{-}1)$$

$$-0.25 < Y\!max/fc < 0.25 \quad (8)$$

$$0.15 < Y\!max/fc < 0.15 \quad (8\text{-}1)$$

$$0.1 < Y\!max/fc1 < 0.7 \quad (9)$$

$$0.2 < Y\!max/fc1 < 0.6 \quad (9\text{-}1)$$

$$-1 < Y\!max/fc2 < -0.4 \quad (10)$$

$$-0.95 < Y\!max/fc2 < -0.45 \quad (10\text{-}1)$$

$$0.2 < Y\!max/fc3 < 0.45 \quad (11)$$

$$0.25 < Y\!max/fc3 < 0.4 \quad (11\text{-}1)$$

Here, ν1 is an Abbe number of the positive lens on the magnification side within the three cemented lenses CL at the d line, ν2 is an Abbe number of the negative lens within the three cemented lenses CL at the d line, ν3 is an Abbe number of the positive lens on the reduction side within the three cemented lenses CL at the d line.

Ymax is a maximum image height on the reduction side, fc is a focal length of the three cemented lenses CL.

fc1 is a focal length of the positive lens on the magnification side within the three cemented lenses CL, fc2 is a focal length of the negative lens within the three cemented lenses CL, and fc3 is a focal length of the positive lens on the reduction side within the three cemented lenses CL.

It is preferable that the three cemented lenses CL preferably included in the above-mentioned first optical system 1 satisfy Conditional Expression (12).

$$0.3 < Y\!max/Rc1 < 0.7 \quad (12)$$

Here, Ymax is a maximum image height on the reduction side, and

Rc1 is a radius of curvature of a cemented surface on the reduction side within the three cemented lenses.

By not allowing the result of Conditional Expression (12) to be equal to or less than the lower limit, it is possible to prevent effects of correction of astigmatism and chromatic aberration from becoming weak. By not allowing the result of Conditional Expression (12) to be equal to or greater than the upper limit, it becomes easy to prevent astigmatism from being excessively corrected. By satisfying Conditional Expression (12-1), it is possible to enhance effects relating to Conditional Expression (12).

$$0.32 < Y\!max/Rc1 < 0.68 \quad (12\text{-}1)$$

It is preferable that the zoom lens satisfies any one or an arbitrary combination of the following conditional expressions (13), (13-1), (14), and (14-1).

$$0.96 < (Mag2T/Mag2W)/Zm < 1.19 \quad (13)$$

$$0.97 < (Mag2T/Mag2W)/Zm < 1.18 \quad (13\text{-}1)$$

$$0.8 < (Mag3T/Mag3W)/Zm < 1 \quad (14)$$

$$0.85 < (Mag3T/Mag3W)/Zm < \quad (14\text{-}1)$$

Here, Mag2T is a lateral magnification of the second lens group G2 at a telephoto end, Mag2W is a lateral magnification of the second lens group G2 at the wide-angle end, Zm is a zoom ratio of the whole system, Mag3T is a lateral magnification of the third lens group G3 at the telephoto end, and Mag3W is a lateral magnification of the third lens group G3 at the wide-angle end.

Zm of Conditional Expression (13) and the like is a zoom ratio of the wide-angle end and the telephoto end of the whole system, and indicates Zm=ft/fw, where fw is a focal length of the whole system at the wide-angle end and ft is a focal length of the whole system at the telephoto end. By satisfying Conditional Expression (13), particularly, it becomes easy to appropriately distribute the refractive power to the second lens group G2 and the third lens group G3, and there is an advantage in suppressing spherical aberration. By satisfying Conditional Expression (13-1), it is possible to enhance effects relating to Conditional Expression (13).

By satisfying Conditional Expression (14), particularly, it becomes easy to appropriately distribute the refractive power to the second lens group G2 and the third lens group G3, and there is an advantage in suppressing spherical aberration. By satisfying Conditional Expression (14-1), it is possible to enhance effects relating to Conditional Expression (14).

The above-mentioned preferred configurations and available configurations may be arbitrary combinations, and it is preferable to selectively adopt the configurations in accordance with required specification. According to the present embodiment, it is possible to realize a high optical performance zoom lens that has a small F number with a wide angle. It should be noted that the term "small F number" described herein means that the F number is smaller than 2.4, and the term "wide angle" means that the total angle of view is greater than 1200.

Next, numerical examples of the zoom lens of the present invention will be described.

Example 1

A lens configuration and an optical path of a zoom lens of Example 1 are shown in FIG. 1, and a configuration and an illustration method thereof is as described above.

Therefore, repeated description is partially omitted herein. The zoom lens of Example 1 includes, in order from the magnification side, a first optical system 1 and a second optical system 2. The first optical system 1 includes, in order from the magnification side, a front group Ga, an intermediate group Gb, and a rear group Gc, and only the intermediate group Gb moves in the direction of the optical axis during focusing. The second optical system 2 includes, in order from the magnification side, a first lens group G1 that has a positive refractive power, a second lens group G2 that has a positive refractive power, a third lens group G3 that has a positive refractive power, and a fourth lens group G4 that has a positive refractive power. During zooming, the first lens group G1 and the fourth lens group G4 remain stationary with respect to the reduction side imaging plane. The second lens group G2 and the third lens group G3 move along loci different from each other.

Table 1 shows basic lens data of the zoom lens of Example 1, Table 2 shows various kinds of data, and Table 3 shows aspheric coefficients thereof. In Table 1, the column of Si shows i-th (i=1, 2, 3 . . . ) surface number. The i-th surface number is attached to each of surfaces of the elements, where i sequentially increases toward the reduction side in a case where a magnification side surface of an element closest to the magnification side is regarded as a first surface. The column of Ri shows a radius of curvature of the i-th surface. The column of Di shows a surface spacing on the optical axis between the i-th surface and an (i+1)th surface. In Table 1, the column of Ndj shows a refractive index of a j-th (j=1, 2, 3, . . . ) element at the d line (a wavelength of 587.6 nm), where j sequentially increases toward the reduction side in a case where the element closest to the magnification side is regarded as the first element. The column of vdj shows an Abbe number of the j-th element on the basis of the d line.

Here, signs of radii of curvature of surface shapes convex toward the magnification side are set to be positive, and signs of radii of curvature of surface shapes convex toward the reduction side are set to be negative. Table 1 additionally shows the optical member PP. In Table 1, the variable surface spacings, which are variable during zooming, are referenced by the reference signs DD[ ], and are written into places of Di, where magnification side surface numbers of spacings are noted in [ ].

In the range of Table 2, values of the zoom ratio Zr, the absolute value |f| of the focal length of the whole system, the F number FNo, the maximum total angle of view 2ω, and the variable surface spacing are based on the d line. (°) in the place of 2ω indicates that the unit thereof is a degree. In Table 2, values at the wide-angle end state are shown in the column labeled by WIDE, and values at the telephoto end state are shown in the column labeled by TELE.

In Table 1, the reference sign * is attached to surface numbers of aspheric surfaces, and numerical values of the paraxial radius of curvature are written into the column of the radius of curvature of the aspheric surface. Table 3 shows aspheric coefficients of the aspheric surfaces of Example 1. The "E±n" (n: an integer) in numerical values of the aspheric coefficients of Table 3 indicates "×10$^{±n}$". The aspheric coefficients are values of the coefficients KA and Am (m is an integer equal to or greater than 3, and is different for each surface) in aspheric surface expression represented by the following expression.

$$Zd = \frac{C \times h^2}{1 + \sqrt{1 - KA \times C^2 \times h^2}} + \sum_m Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, and KA and Am are aspheric coefficients.

In data of each table, a degree is used as a unit of an angle, and mm is used as a unit of a length, but appropriate different units may be used since the optical system can be used even in a case where the system is enlarged or reduced in proportion. Further, each of the following tables shows numerical values rounded off to predetermined decimal places.

TABLE 1

EXAMPLE 1

| Si | Ri | Di | Ndj | vdj |
|---|---|---|---|---|
| *1 | −26.5556 | 3.6104 | 1.49100 | 57.58 |
| *2 | −140.5249 | 3.0032 | | |
| 3 | 70.9448 | 2.8990 | 1.76450 | 49.10 |
| 4 | 34.7489 | 11.0420 | | |
| 5 | 95.6805 | 2.0992 | 1.83400 | 37.16 |
| 6 | 24.2804 | 12.1933 | | |
| 7 | −380.9225 | 1.6001 | 1.76200 | 40.10 |
| 8 | 32.6549 | 10.5328 | | |
| *9 | 93.6208 | 5.0465 | 1.49100 | 57.58 |
| *10 | 69.0659 | 8.3787 | | |
| 11 | 666.5544 | 9.8410 | 1.74077 | 27.76 |
| 12 | −110.7857 | 1.0004 | | |
| 13 | 569.9588 | 7.1104 | 1.72047 | 34.71 |
| 14 | −54.8296 | 52.5342 | | |
| 15 | 50.1079 | 8.7604 | 1.53775 | 74.70 |
| 16 | −59.3329 | 1.9619 | | |
| 17 | 70.0420 | 12.5563 | 1.55352 | 71.72 |
| 18 | −29.2118 | 2.0438 | 1.80518 | 25.42 |
| 19 | 24.5774 | 9.9222 | 1.49700 | 81.54 |
| 20 | −85.6207 | 12.7409 | | |
| *21 | −63.3374 | 5.9993 | 1.49100 | 57.58 |
| *22 | −46.3944 | 1.3031 | | |
| 23 | 65.0104 | 8.0739 | 1.84666 | 23.78 |
| 24 | −134.1830 | 81.0194 | | |
| 25 | −135.5209 | 2.9999 | 1.80518 | 25.42 |
| 26 | 98.5455 | 15.9079 | 1.58144 | 40.89 |
| 27 | −51.0815 | DD[27] | | |
| 28 | 89.8640 | 8.5190 | 1.79952 | 42.22 |
| 29 | −197.1837 | DD[29] | | |
| 30 | 25.2844 | 4.8921 | 1.83481 | 42.72 |
| 31 | 155.0645 | 1.2379 | | |
| 32 | 243.4932 | 1.3965 | 1.74000 | 28.30 |
| 33 | 17.7616 | 10.7156 | | |
| 34 | −21.7589 | 2.9470 | 1.84666 | 23.78 |
| 35 | 101.9458 | 7.6968 | 1.53775 | 74.70 |
| 36 | −31.4787 | 2.3593 | | |
| 37 | 259.3644 | 6.3063 | 1.53775 | 74.70 |
| 38 | −33.8771 | DD[39] | | |
| 39 | 68.0274 | 5.5625 | 1.89286 | 20.36 |
| 40 | −273.9339 | 16.0000 | | |
| 41 | ∞ | 25.0000 | 1.51633 | 64.14 |
| 42 | ∞ | | | |

TABLE 2

EXAMPLE 1

| | WIDE | TELE |
|---|---|---|
| Zr | 1.00 | 1.10 |
| |f| | 5.03 | 5.53 |
| FNo. | 1.99 | 1.99 |
| 2ω(°) | 141.4 | 137.8 |
| DD[27] | 8.53 | 0.50 |
| DD[29] | 34.57 | 39.72 |
| DD[39] | 11.35 | 14.23 |

TABLE 3

EXAMPLE 1

| SURFACE NUMBER | 1 | 2 | 9 | 10 |
|---|---|---|---|---|
| KA | −1.2613865E+00 | −7.3647229E+00 | 1.0000000E+00 | 1.0000000E+00 |
| A3 | 5.3252094E−04 | 9.0520282E−04 | 2.4960913E−20 | 0.0000000E+00 |
| A4 | 2.0297390E−05 | −1.6495158E−04 | −4.7673669E−05 | −3.4943550E−05 |
| A5 | −1.6523270E−06 | 3.4549338E−05 | 1.6183030E−06 | 2.1648028E−06 |
| A6 | 2.8815385E−08 | −4.9051872E−06 | 2.0457961E−07 | 6.1294107E−08 |
| A7 | 6.2512532E−10 | 4.8378086E−07 | −1.7912796E−08 | −1.2712020E−08 |
| A8 | −3.0147165E−11 | −3.3941644E−08 | −2.1352629E−10 | 2.3129984E−10 |
| A9 | 1.1126358E−13 | 1.7259280E−09 | 6.3012028E−11 | 2.7535340E−11 |
| A10 | 1.3526798E−14 | −6.4350061E−11 | −9.6550235E−13 | −9.4071968E−13 |
| A11 | −2.2221722E−16 | 1.7607235E−12 | −7.3151323E−14 | −1.8880601E−14 |
| A12 | −1.8949879E−18 | −3.4943546E−14 | 2.0242145E−15 | 8.1613578E−16 |
| A13 | 7.4517786E−20 | 4.8920052E−16 | | |
| A14 | −2.5351522E−22 | −4.5779117E−18 | | |
| A15 | −8.0272121E−24 | 2.5687584E−20 | | |
| A16 | 6.6047251E−26 | −6.5340741E−23 | | |

| SURFACE NUMBER | 21 | 22 |
|---|---|---|
| KA | 1.0000000E+00 | 1.0000000E+00 |
| A3 | −2.0764164E−20 | 2.0748660E−20 |
| A4 | 3.5318163E−05 | 7.5174011E−05 |
| A5 | −1.0575496E−06 | −3.3944156E−06 |
| A6 | −3.2094699E−07 | −1.8062460E−07 |
| A7 | 1.6696584E−08 | 2.0064832E−08 |
| A8 | 1.3220701E−09 | 1.2158935E−10 |
| A9 | −1.0868171E−10 | −5.8116789E−11 |
| A10 | −3.0848016E−12 | 2.2268815E−13 |
| A11 | 3.6838047E−13 | 1.0314975E−13 |
| A12 | 2.5924060E−15 | −6.2465689E−16 |
| A13 | −7.0453632E−16 | −1.0775468E−16 |
| A14 | 2.5538834E−18 | 7.0087156E−19 |
| A15 | 7.2724879E−19 | 5.9690137E−20 |
| A16 | −3.8636829E−21 | −3.0180136E−22 |
| A17 | −3.1371210E−22 | −1.3386739E−23 |

Figure 6:
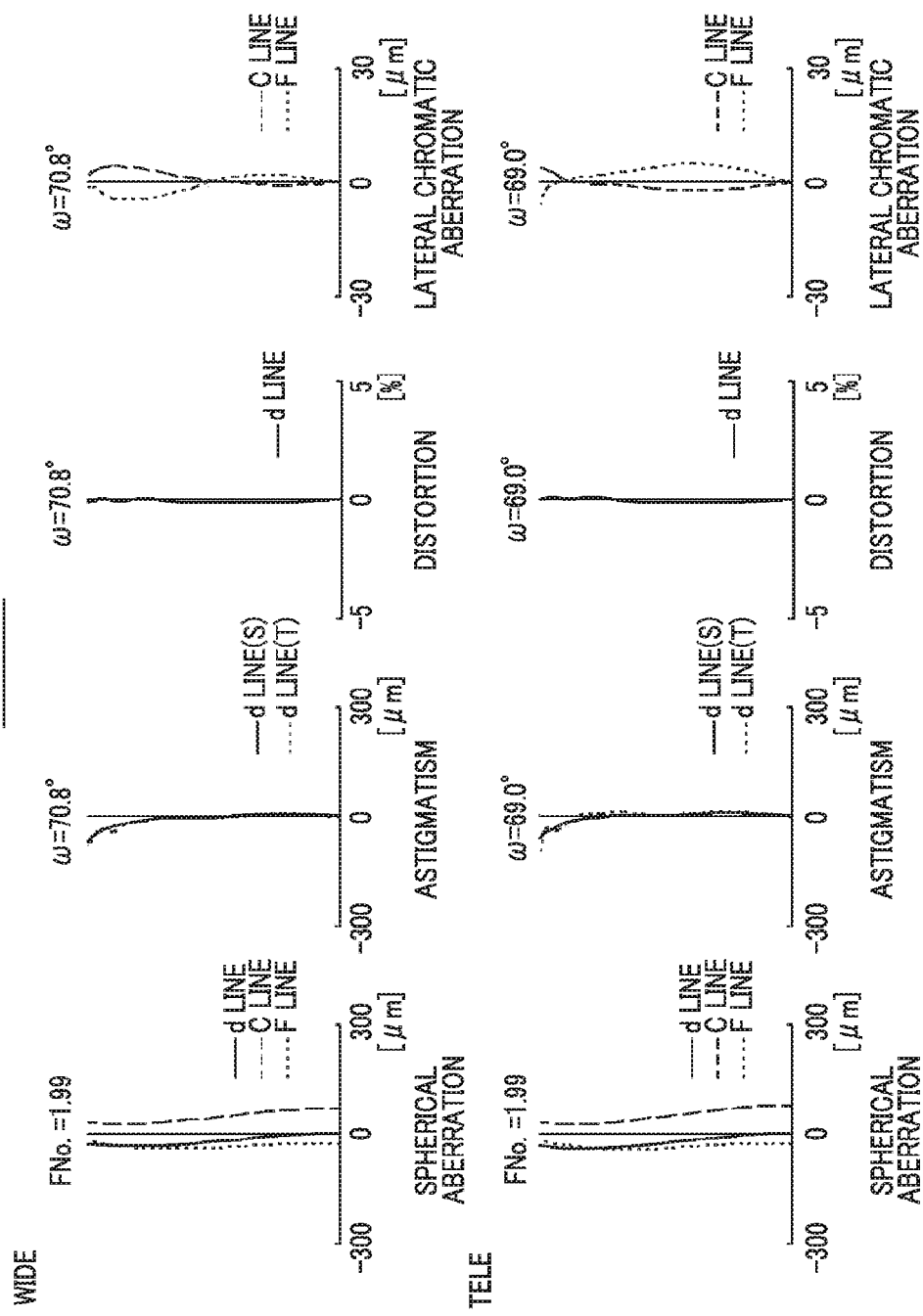
FIG. 6 is a diagram of aberrations of the zoom lens of Example 1 of the present invention.

FIG. 6 shows aberration diagrams of spherical aberration, astigmatism, distortion, and lateral chromatic aberration (chromatic aberration of magnification) of the zoom lens of Example 1, in order from the left side. In FIG. 6, aberrations at the wide-angle end state are shown in the upper part indicated by WIDE, and aberrations at the telephoto end state are shown in the lower part indicated by TELE. In the spherical aberration diagram, aberrations at the d line (a wavelength of 587.6 nm), the C line (a wavelength of 656.3 nm), and the F line (a wavelength of 486.1 nm) are respectively indicated by the solid line, the long dashed line, and the short dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram, FNo. indicates an F number. In the other aberration diagrams, ω indicates a half angle of view. These aberration diagrams are diagrams of aberrations in a case where a distance on the optical axis from the lens surface closest to the magnification side to the magnification side imaging plane is 1.1 m, and this point is the same for those of the following examples.

Reference signs, meanings, and description methods of the respective data pieces according to Example 1 mentioned above are the same as those in the following examples unless otherwise noted. Therefore, in the following description, repeated description will be omitted.

Example 2

Figure 2:
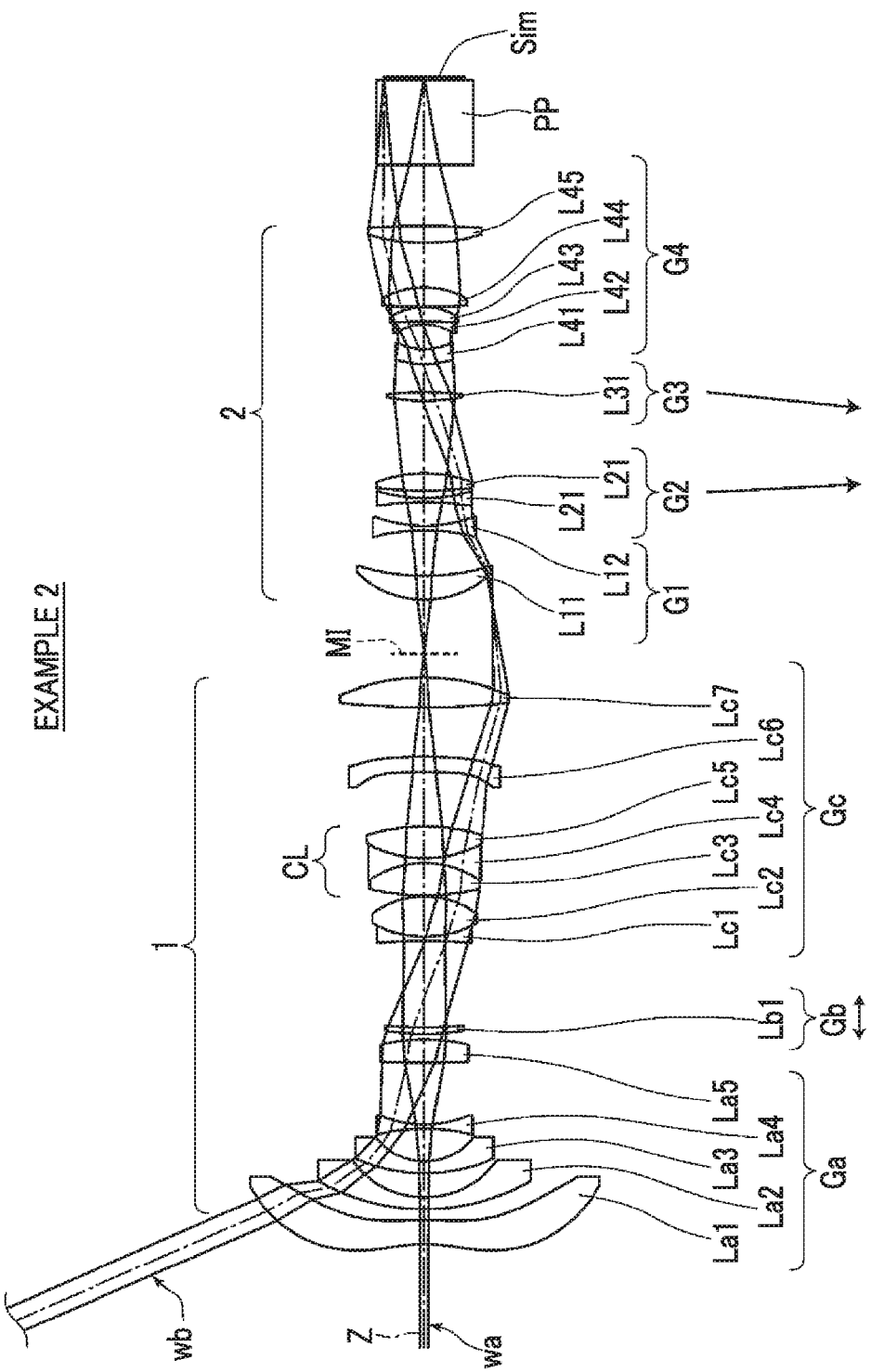
FIG. 2 is a cross-sectional view illustrating a configuration and an optical path of a zoom lens of Example 2 of the present invention.

FIG. 2 is a cross-sectional diagram of a lens configuration and an optical path of a zoom lens of Example 2. The zoom lens of Example 2 includes, in order from the magnification side, a first optical system 1 and a second optical system 2. The second optical system 2 forms an intermediate image MI at a position conjugate to an image display surface Sim, and the first optical system 1 causes the intermediate image MI to be re-imaged on a screen Scr. The first optical system 1 includes, in order from the magnification side, a front group Ga, an intermediate group Gb, and a rear group Gc. The second optical system 2 includes, in order from the magnification side, a first lens group G1, a second lens group G2, a third lens group G3, and a fourth lens group G4. The present example is the same as Example 1 in terms of the signs of refractive powers of the lens groups, the lens groups moving during focusing, and the lens groups moving during zooming.

The front group Ga includes, in order from the magnification side, five lenses as lenses La1 to La5, the intermediate group Gb includes only one lens as a lens Lb1, and the rear group Gc includes seven lenses as the lenses Lc1 to Lc7. The number of lenses constituting each lens group of the first to fourth lens groups G1 to G4 is the same as that of Example 1.

Figure 7:
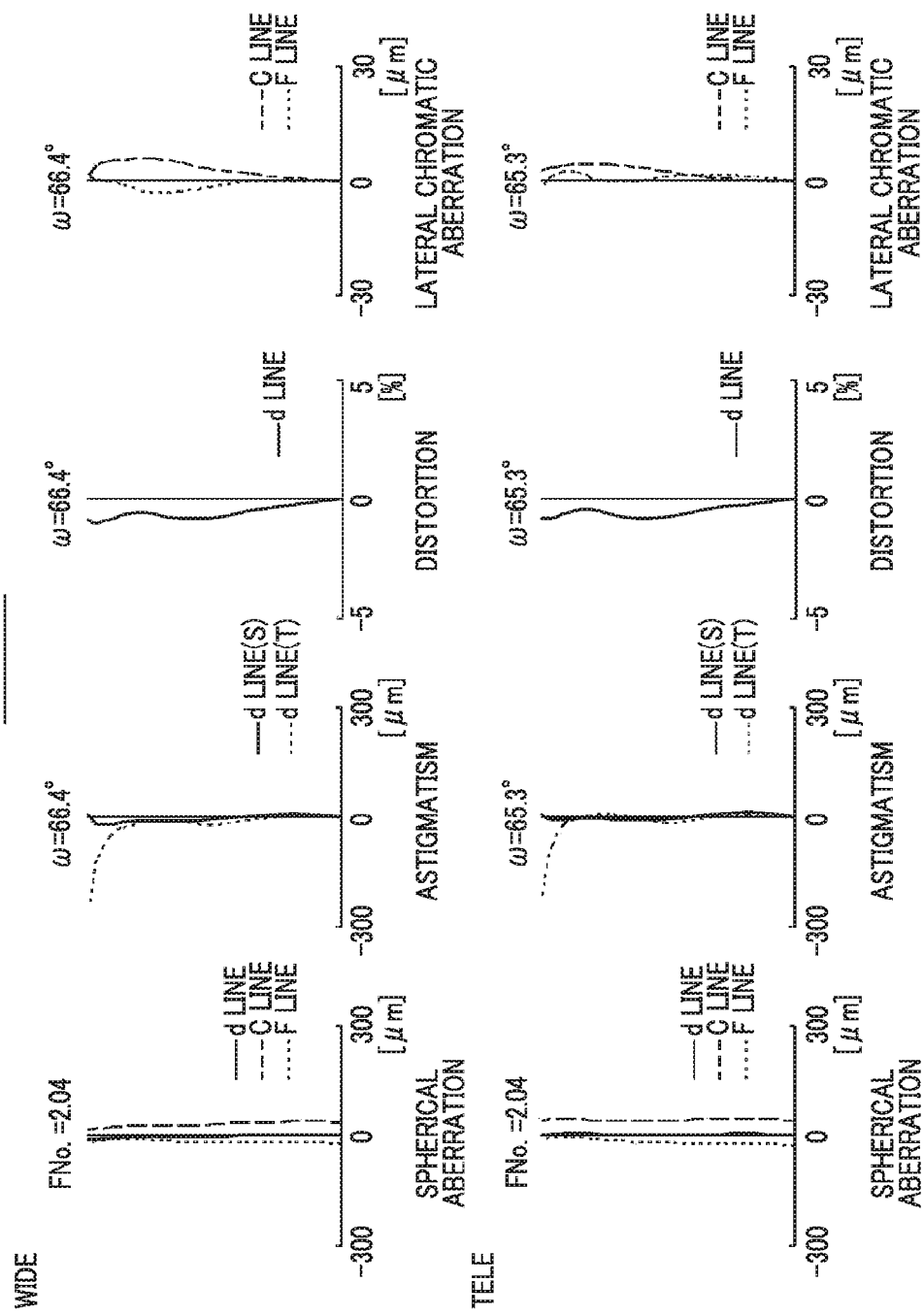
FIG. 7 is a diagram of aberrations of the zoom lens of Example 2 of the present invention.

Table 4 shows basic lens data of the zoom lens of Example 2, Table 5 shows various kinds of data, Table 6 shows aspheric coefficients, and FIG. 7 shows aberration diagrams.

TABLE 4

EXAMPLE 2

| Si | Ri | Di | Ndj | vdj |
|---|---|---|---|---|
| *1 | −38.8948 | 8.7124 | 1.49100 | 57.58 |
| *2 | −85.9484 | 4.0800 | | |
| 3 | 76.7479 | 4.3562 | 1.69680 | 55.53 |
| 4 | 32.1961 | 8.7938 | | |
| 5 | 60.9856 | 4.3553 | 1.91082 | 35.25 |
| 6 | 21.7102 | 11.9862 | | |
| 7 | −69.5592 | 1.5435 | 1.67790 | 55.34 |
| 8 | 39.3982 | 22.6667 | | |
| 9 | 389.0571 | 8.7052 | 1.83400 | 37.16 |
| 10 | −59.0949 | 1.8930 | | |
| 11 | 77.4454 | 2.4799 | 1.89286 | 20.36 |
| 12 | 215.5324 | 31.5773 | | |
| 13 | −173.6166 | 1.5567 | 1.71736 | 29.52 |
| 14 | 36.7946 | 14.7432 | 1.49700 | 81.61 |
| 15 | −31.3946 | 0.3744 | | |
| 16 | 83.7757 | 11.9376 | 1.69680 | 55.53 |
| 17 | −34.3955 | 1.7775 | 1.80518 | 25.46 |
| 18 | 42.6694 | 11.5185 | 1.49700 | 81.61 |
| 19 | −71.6451 | 20.0200 | | |
| *20 | −160.7868 | 5.8498 | 1.49100 | 57.58 |
| *21 | −89.3202 | 18.0692 | | |
| 22 | 303.3488 | 10.4863 | 1.80518 | 25.46 |
| 23 | −79.1122 | 29.0123 | | |

TABLE 4-continued

EXAMPLE 2

| Si | Ri | Di | Ndj | vdj |
|---|---|---|---|---|
| 24 | 35.3996 | 8.6345 | 1.80518 | 25.46 |
| 25 | 80.5805 | 16.7301 | | |
| 26 | −71.1261 | 1.6440 | 1.51742 | 52.43 |
| 27 | 49.7091 | DD[27] | | |
| 28 | −113.3374 | 1.5151 | 1.51633 | 64.14 |
| 29 | 55.6338 | 2.9322 | | |
| 30 | 153.6165 | 6.2230 | 1.80400 | 46.58 |
| 31 | −48.3707 | DD[31] | | |
| 32 | 69.9069 | 3.1546 | 1.59282 | 68.62 |
| 33 | −119.4918 | DD[33] | | |
| 34 | 34.9272 | 5.4010 | 1.53172 | 48.84 |
| 35 | 21.4022 | 9.0568 | | |
| 36 | −17.2184 | 1.1226 | 1.80518 | 25.46 |
| 37 | −169.3023 | 5.3285 | 1.59282 | 68.62 |
| 38 | −22.0459 | 0.0383 | | |
| 39 | 253.6250 | 7.1006 | 1.49700 | 81.61 |
| 40 | −30.0789 | 16.2734 | | |
| 41 | 67.8724 | 6.2187 | 1.89286 | 20.36 |
| 42 | −294.3287 | 22.4034 | | |
| 43 | ∞ | 31.1159 | 1.51633 | 64.14 |
| 44 | ∞ | | | |

TABLE 5

EXAMPLE 2

| | WIDE | TELE |
|---|---|---|
| Zr | 1.00 | 1.05 |
| \|f\| | 6.34 | 6.66 |
| FNo. | 2.04 | 2.04 |
| 2ω(°) | 132.8 | 130.6 |
| DD[27] | 8.53 | 9.95 |
| DD[31] | 26.60 | 20.99 |
| DD[33] | 10.41 | 14.60 |

TABLE 6

EXAMPLE 2

| SURFACE NUMBER | 1 | 2 | 20 | 21 |
|---|---|---|---|---|
| KA | −2.2463406E−01 | −1.4999999E+01 | −1.5000000E+01 | −5.2188357E+00 |
| A3 | 3.2613996E−04 | 5.6729572E−04 | −2.1940619E−05 | −2.0690856E−05 |
| A4 | 8.3596205E−06 | −7.2077418E−05 | 2.4712723E−05 | 3.2551947E−05 |
| A5 | −4.2016709E−07 | 1.1130131E−05 | −2.4653262E−06 | −1.0652502E−06 |
| A6 | 4.4323836E−09 | −1.1924720E−06 | 1.6502151E−07 | −1.0724668E−07 |
| A7 | 9.3506513E−11 | 8.8878392E−08 | −2.5045504E−08 | 7.9032131E−09 |
| A8 | −2.6378717E−12 | −4.7128424E−09 | 2.2390745E−09 | −3.3547010E−10 |
| A9 | 2.0544121E−15 | 1.8110880E−10 | −9.5801696E−11 | 1.4536588E−11 |
| A10 | 6.5217158E−16 | −5.1022909E−12 | 1.0743948E−12 | −3.8913627E−13 |
| A11 | −6.7868336E−18 | 1.0548542E−13 | 3.7692915E−14 | 1.3035044E−15 |
| A12 | −5.1050362E−20 | −1.5819586E−15 | 1.4993653E−15 | 1.9491801E−17 |
| A13 | 1.2847964E−21 | 1.6737201E−17 | −2.1084521E−16 | 1.0106423E−17 |
| A14 | −2.9819973E−24 | −1.1836093E−19 | 6.6516332E−18 | −4.1192407E−19 |
| A15 | −7.5443485E−26 | 5.0174322E−22 | −7.8264647E−20 | 6.1157273E−21 |
| A16 | 4.5974345E−28 | −9.6362739E−25 | 2.1005731E−22 | −3.4809360E−23 |

Example 3

Figure 3:
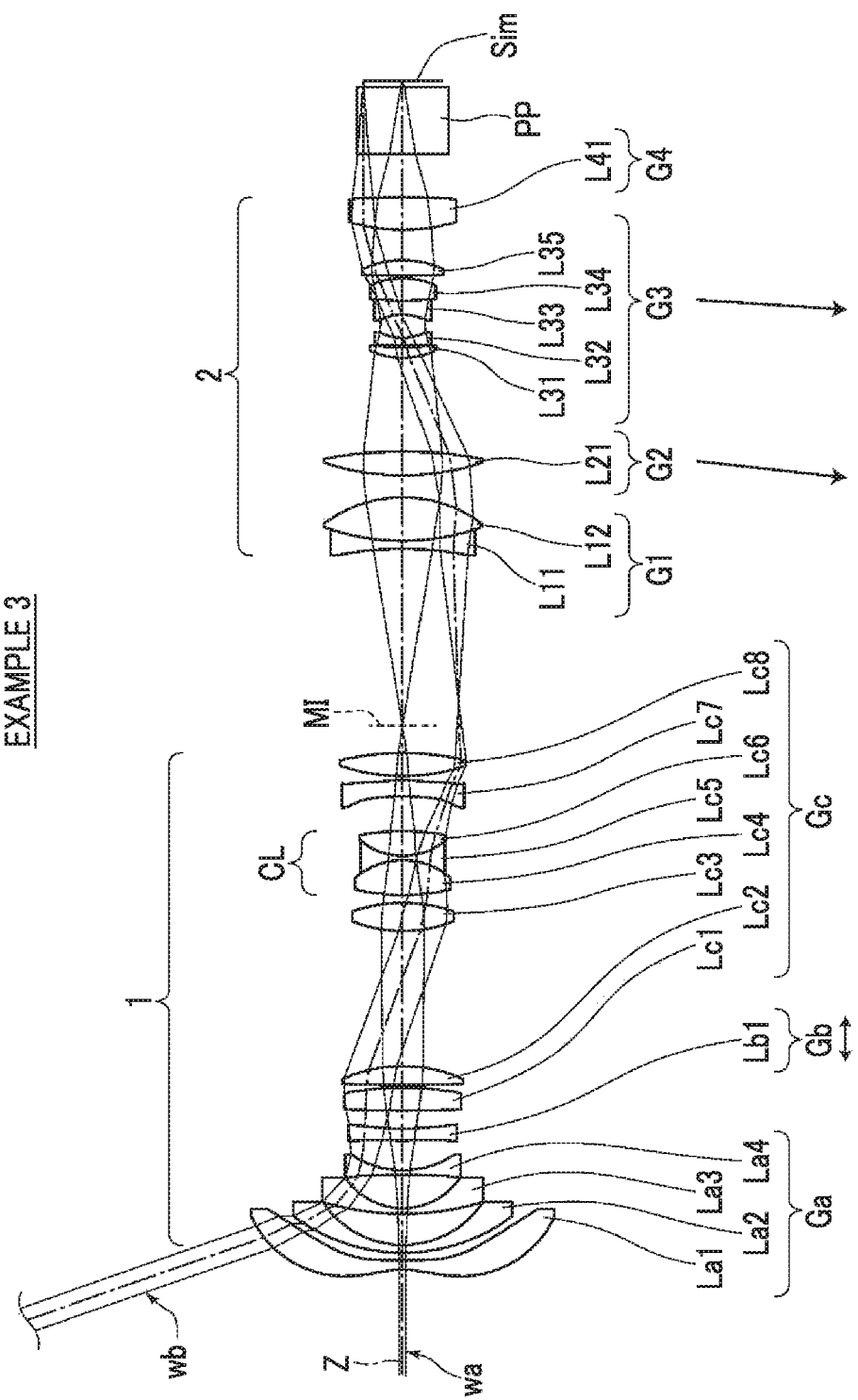
FIG. 3 is a cross-sectional view illustrating a configuration and an optical path of a zoom lens of Example 3 of the present invention.

FIG. 3 is a cross-sectional diagram of a lens configuration and an optical path of a zoom lens of Example 3. The zoom lens of Example 3 includes, in order from the magnification side, a first optical system 1 and a second optical system 2. The second optical system 2 forms an intermediate image MI at a position conjugate to an image display surface Sim, and the first optical system 1 causes the intermediate image MI to be re-imaged on a screen Scr. The first optical system 1 includes, in order from the magnification side, a front group Ga, an intermediate group Gb, and a rear group Gc. The second optical system 2 includes, in order from the magnification side, a first lens group G1, a second lens group G2, a third lens group G3, and a fourth lens group G4. The present example is the same as Example 1 in terms of the signs of refractive powers of the lens groups, the lens groups moving during focusing, the lens groups moving during zooming, and the number of lenses constituting each lens group.

Figure 8:
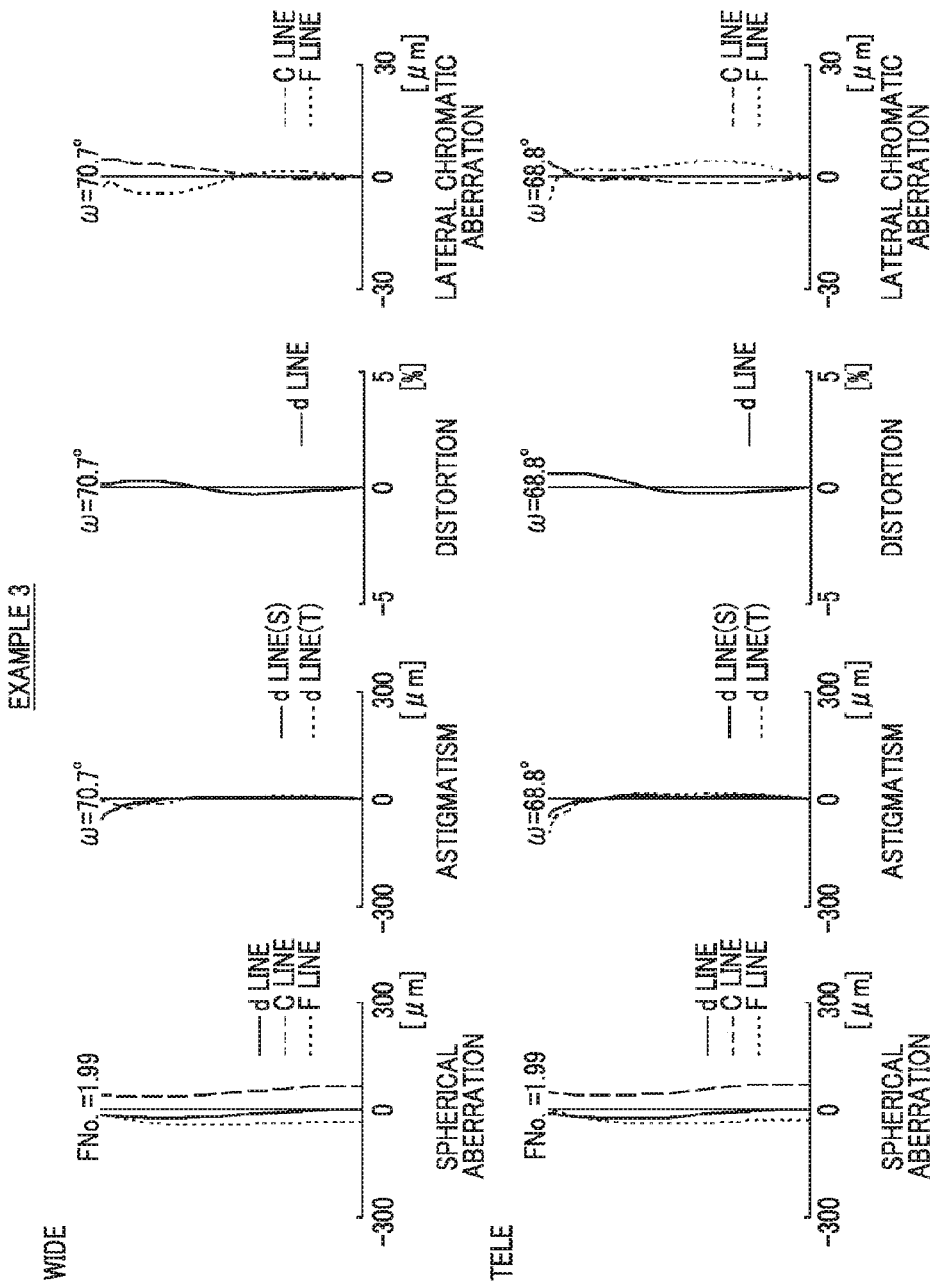
FIG. 8 is a diagram of aberrations of the zoom lens of Example 3 of the present invention.

Table 7 shows basic lens data of the zoom lens of Example 3, Table 8 shows various kinds of data, Table 9 shows aspheric coefficients, and FIG. 8 shows aberration diagrams.

TABLE 7

EXAMPLE 3

| Si | Ri | Di | Ndj | vdj |
|---|---|---|---|---|
| *1 | −26.2047 | 3.6009 | 1.49100 | 57.58 |
| *2 | −124.5765 | 2.7225 | | |
| 3 | 66.4727 | 2.8997 | 1.76450 | 49.10 |
| 4 | 35.1629 | 11.5865 | | |
| 5 | 100.0377 | 2.1008 | 1.83400 | 37.16 |
| 6 | 25.1969 | 12.5444 | | |
| 7 | −216.6825 | 1.5990 | 1.76200 | 40.10 |
| 8 | 33.1729 | 11.1134 | | |
| *9 | 99.7649 | 4.4430 | 1.49100 | 57.58 |
| *10 | 71.2936 | 6.7924 | | |
| 11 | 704.4005 | 8.4778 | 1.72151 | 29.23 |
| 12 | −115.6459 | 1.0000 | | |
| 13 | 537.5557 | 7.0492 | 1.71736 | 29.52 |
| 14 | −53.7523 | 50.4678 | | |
| 15 | 49.1037 | 10.4873 | 1.53775 | 74.70 |
| 16 | −54.2567 | 2.9109 | | |
| 17 | 73.0565 | 13.0028 | 1.55352 | 71.72 |
| 18 | −26.5434 | 1.6458 | 1.80518 | 25.42 |
| 19 | 23.9746 | 9.2135 | 1.49700 | 81.54 |
| 20 | −80.3603 | 12.9439 | | |
| *21 | −88.6301 | 5.9991 | 1.49100 | 57.58 |
| *22 | −62.4927 | 1.6533 | | |
| 23 | 72.6625 | 8.5385 | 1.84666 | 23.78 |
| 24 | −98.7668 | 76.2255 | | |
| 25 | −122.4794 | 3.0001 | 1.80518 | 25.42 |
| 26 | 85.3131 | 16.2028 | 1.58144 | 40.89 |
| 27 | −47.7758 | DD[27] | | |
| 28 | 91.0700 | 8.8828 | 1.79952 | 42.22 |
| 29 | −158.1128 | DD[29] | | |
| 30 | 25.9719 | 4.0286 | 1.83481 | 42.72 |
| 31 | 105.0397 | 0.6970 | | |
| 32 | 141.6537 | 2.8096 | 1.74000 | 28.30 |
| 33 | 17.7800 | 8.5765 | | |
| 34 | −19.2744 | 5.3939 | 1.84666 | 23.78 |
| 35 | 154.4601 | 8.3100 | 1.53775 | 74.70 |
| 36 | −27.8657 | 0.7735 | | |
| 37 | 251.8370 | 5.8873 | 1.53775 | 74.70 |
| 38 | −34.5506 | DD[39] | | |
| 39 | 68.1152 | 12.1778 | 1.89286 | 20.36 |
| 40 | −236.2780 | 16.0000 | | |
| 41 | ∞ | 25.0000 | 1.51633 | 64.14 |
| 42 | ∞ | | | |

TABLE 8

EXAMPLE 3

| | WIDE | TELE |
|---|---|---|
| Zr | 1.00 | 1.10 |
| \|f\| | 5.04 | 5.54 |
| FNo. | 1.99 | 1.99 |
| 2ω(°) | 141.4 | 137.6 |
| DD[27] | 8.20 | 0.52 |
| DD[29] | 34.94 | 39.83 |
| DD[39] | 11.39 | 14.19 |

TABLE 9

EXAMPLE 3

| SURFACE NUMBER | 1 | 2 | 9 | 10 |
|---|---|---|---|---|
| KA | −1.2785844E+00 | −7.2629733E+00 | 1.0000000E+00 | 1.0000000E+00 |
| A3 | 5.1363196E−04 | 8.8351477E−04 | −2.6344945E−20 | −2.6084811E−20 |
| A4 | 1.9282104E−05 | −1.6344530E−04 | −5.1259253E−05 | −3.8649960E−05 |
| A5 | −1.5225586E−06 | 3.4467797E−05 | 1.2923735E−06 | 1.9038710E−06 |
| A6 | 2.7636140E−08 | −4.9000410E−06 | 2.6012112E−07 | 1.1778594E−07 |
| A7 | 5.4455296E−10 | 4.8327031E−07 | −1.6578660E−08 | −1.2858119E−08 |
| A8 | −2.8041278E−11 | −3.3890940E−08 | −5.0137089E−10 | 7.1975572E−12 |
| A9 | 1.3564566E−13 | 1.7228812E−09 | 6.3956612E−11 | 3.2500074E−11 |
| A10 | 1.2138635E−14 | −6.4228135E−11 | −4.4717563E−13 | −6.6603964E−13 |
| A11 | −2.1439825E−16 | 1.7571214E−12 | −8.0543093E−14 | −2.7238532E−14 |
| A12 | −1.5679640E−18 | −3.4864616E−14 | 1.8489964E−15 | 8.0396695E−16 |
| A13 | 6.8869848E−20 | 4.8798865E−16 | | |
| A14 | −2.5420557E−22 | −4.5657877E−18 | | |
| A15 | −7.2140822E−24 | 2.5616030E−20 | | |
| A16 | 5.9700704E−26 | −6.5145943E−23 | | |

| SURFACE NUMBER | 21 | 22 |
|---|---|---|
| KA | 1.0000000E+00 | 1.0000000E+00 |
| A3 | −2.0481461E−20 | −1.0178406E−19 |

TABLE 9-continued

| EXAMPLE 3 | | |
|---|---|---|
| A4 | 3.0436521E−05 | 6.6321578E−05 |
| A5 | −2.3887286E−06 | −4.0709571E−06 |
| A6 | −1.8872462E−07 | −1.1562578E−07 |
| A7 | 2.0081431E−08 | 2.0009005E−08 |
| A8 | 3.6725933E−10 | −1.0882304E−10 |
| A9 | −9.9245944E−11 | −5.2254807E−11 |
| A10 | 5.3803053E−13 | 6.4933405E−13 |
| A11 | 2.7676420E−13 | 8.9068377E−14 |
| A12 | −4.8429363E−15 | −1.0312329E−15 |
| A13 | −4.4769733E−16 | −9.4576542E−17 |
| A14 | 1.0213063E−17 | 8.7025324E−19 |
| A15 | 4.0826059E−19 | 5.5326716E−20 |
| A16 | −6.9298633E−21 | −3.1679067E−22 |
| A17 | −1.6500075E−22 | −1.3433918E−23 |

Example 4

Figure 4:
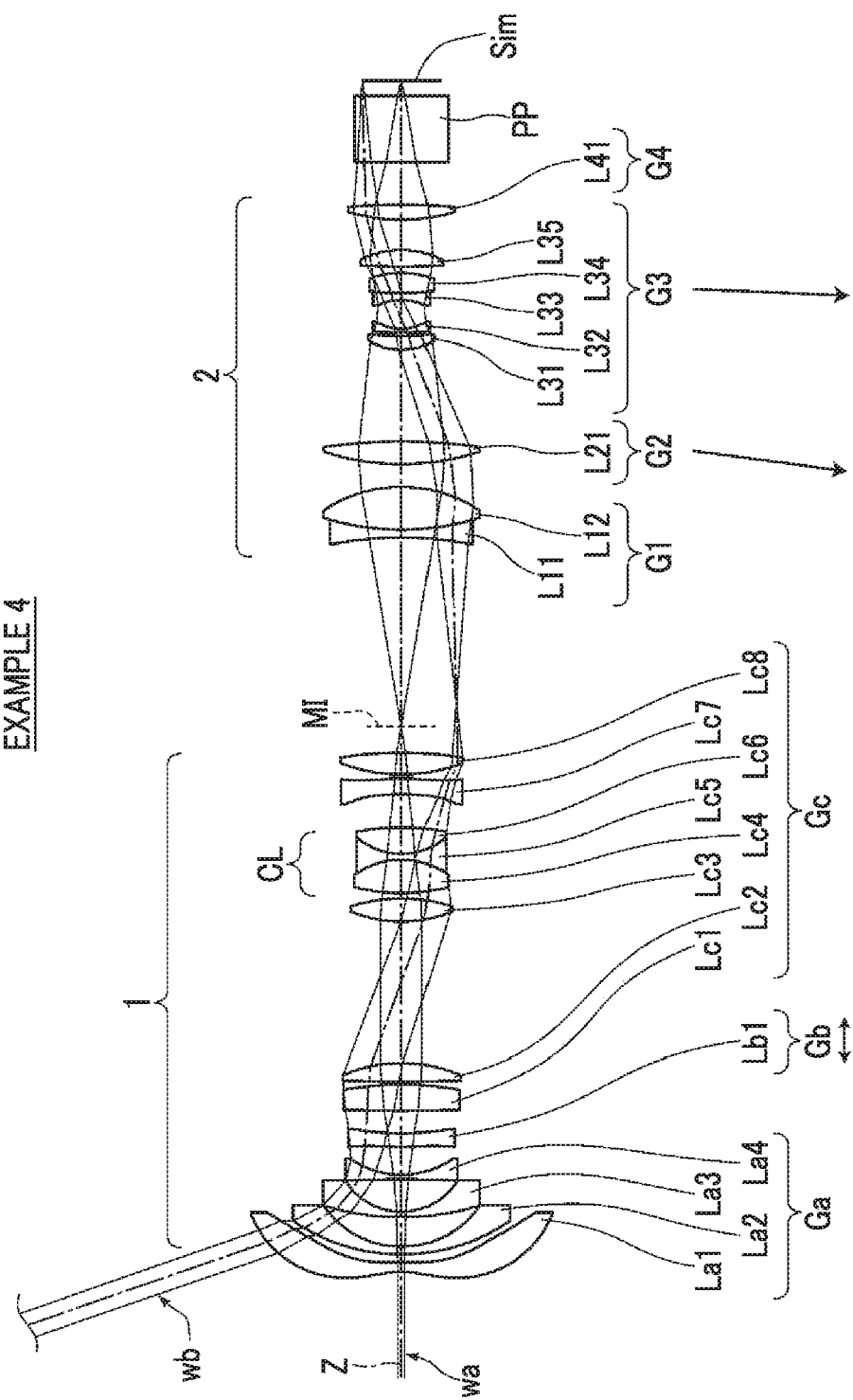
FIG. 4 is a cross-sectional view illustrating a configuration and an optical path of a zoom lens of Example 4 of the present invention.

FIG. 4 is a cross-sectional diagram of a lens configuration and an optical path of a zoom lens of Example 4. The zoom lens of Example 4 includes, in order from the magnification side, a first optical system 1 and a second optical system 2. The second optical system 2 forms an intermediate image MI at a position conjugate to an image display surface Sim, and the first optical system 1 causes the intermediate image MI to be re-imaged on a screen Scr. The first optical system 1 includes, in order from the magnification side, a front group Ga, an intermediate group Gb, and a rear group Gc. The second optical system 2 includes, in order from the magnification side, a first lens group G1, a second lens group G2, a third lens group G3, and a fourth lens group G4. Example 4 is different from Example 1 in that the third lens group G3 has a negative refractive power. Otherwise, Example 4 is the same as Example 1 in terms of the signs of refractive powers of the lens groups, the lens groups moving during focusing, the lens groups moving during zooming, and the number of lenses constituting each lens group.

Figure 9:
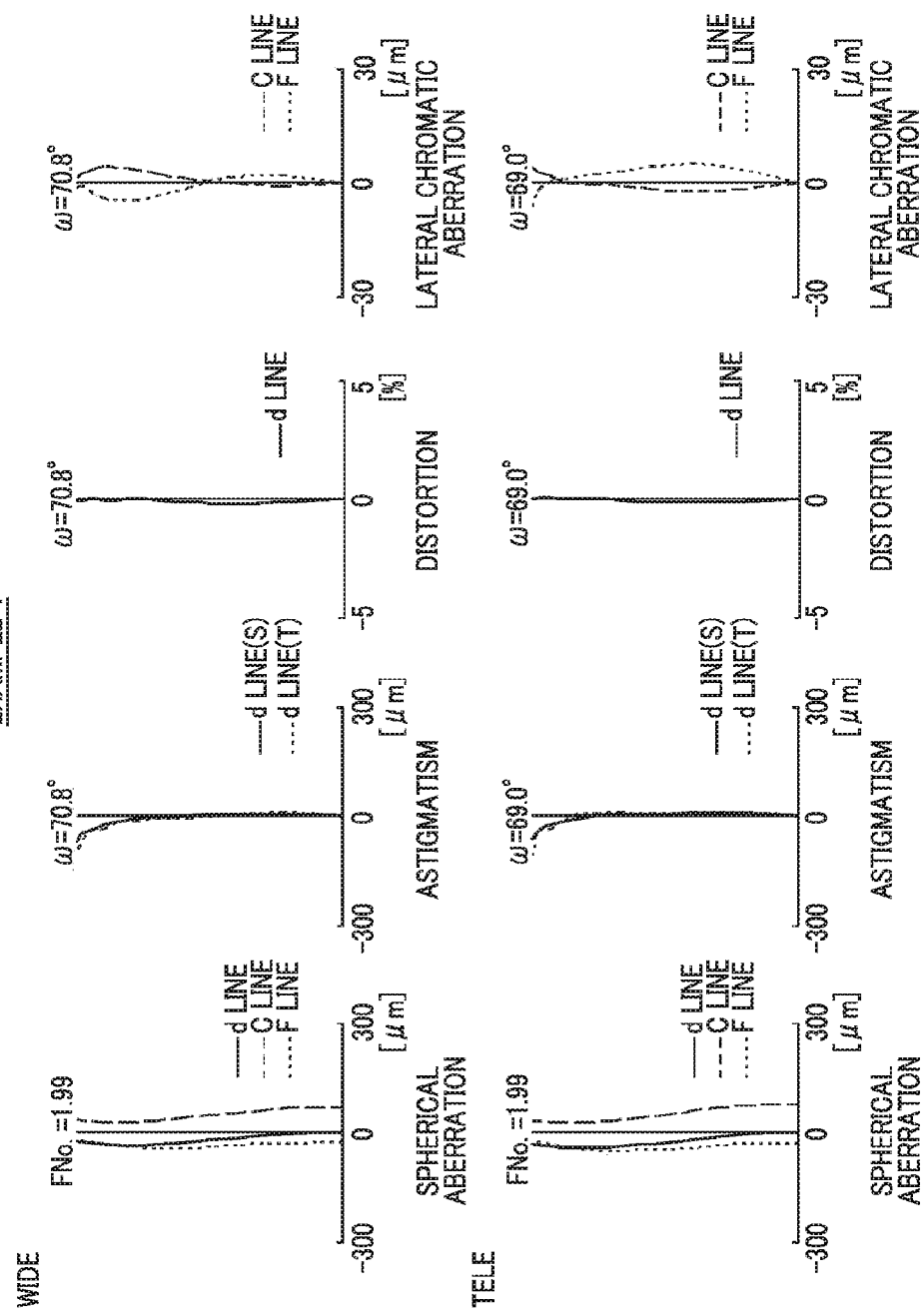
FIG. 9 is a diagram of aberrations of the zoom lens of Example 4 of the present invention.

Table 10 shows basic lens data of the zoom lens of Example 4, Table 11 shows various kinds of data, Table 12 shows aspheric coefficients, and FIG. 9 shows aberration diagrams.

TABLE 10

| EXAMPLE 4 | | | | |
|---|---|---|---|---|
| Si | Ri | Di | Ndj | vdj |
| *1 | −26.5543 | 3.5991 | 1.49100 | 57.58 |
| *2 | −143.5304 | 2.9464 | | |
| 3 | 70.6817 | 2.8992 | 1.76450 | 49.10 |
| 4 | 34.9297 | 11.0329 | | |
| 5 | 96.3367 | 2.1000 | 1.83400 | 37.16 |
| 6 | 24.2679 | 12.2389 | | |
| 7 | −365.6907 | 1.6002 | 1.76200 | 40.10 |
| 8 | 32.5829 | 10.4612 | | |
| *9 | 92.9954 | 5.1262 | 1.49100 | 57.58 |
| *10 | 69.7940 | 8.4631 | | |
| 11 | 678.7665 | 9.8840 | 1.74077 | 27.76 |
| 12 | −111.0459 | 1.0010 | | |
| 13 | 577.1719 | 6.9729 | 1.72047 | 34.71 |
| 14 | −54.8306 | 52.9716 | | |
| 15 | 50.1031 | 8.6795 | 1.53775 | 74.70 |
| 16 | −59.4614 | 1.9797 | | |
| 17 | 69.1288 | 12.5312 | 1.55352 | 71.72 |
| 18 | −29.2409 | 2.1800 | 1.80518 | 25.42 |
| 19 | 24.7051 | 9.9491 | 1.49700 | 81.54 |
| 20 | −86.0849 | 12.5078 | | |
| *21 | −63.8942 | 6.0000 | 1.49100 | 57.58 |
| *22 | −47.8402 | 1.3763 | | |

TABLE 10-continued

| EXAMPLE 4 | | | | |
|---|---|---|---|---|
| Si | Ri | Di | Ndj | vdj |
| 23 | 61.6868 | 8.1800 | 1.84666 | 23.78 |
| 24 | −145.0029 | 81.1441 | | |
| 25 | −137.1892 | 2.9994 | 1.80518 | 25.42 |
| 26 | 97.1982 | 16.0485 | 1.58144 | 40.89 |
| 27 | −51.3549 | DD[27] | | |
| 28 | 89.3315 | 8.5106 | 1.79952 | 42.22 |
| 29 | −199.0812 | DD[29] | | |
| 30 | 25.2642 | 4.9641 | 1.83481 | 42.72 |
| 31 | 147.6741 | 1.2889 | | |
| 32 | 212.6799 | 1.3347 | 1.74000 | 28.30 |
| 33 | 17.7524 | 10.6876 | | |
| 34 | −21.6647 | 2.6895 | 1.84666 | 23.78 |
| 35 | 87.4146 | 7.6182 | 1.53775 | 74.70 |
| 36 | −31.9993 | 2.3044 | | |
| 37 | 301.1198 | 6.2403 | 1.53775 | 74.70 |
| 38 | −32.9713 | DD[39] | | |
| 39 | 68.9352 | 5.6336 | 1.89286 | 20.36 |
| 40 | −235.4227 | 16.0000 | | |
| 41 | ∞ | 25.0000 | 1.51633 | 64.14 |
| 42 | ∞ | | | |

TABLE 11

| EXAMPLE 4 | | |
|---|---|---|
| | WIDE | TELE |
| Zr | 1.00 | 1.10 |
| \|f\| | 5.03 | 5.53 |
| FNo. | 1.99 | 1.99 |
| 2ω(°) | 141.6 | 138.2 |
| DD[27] | 8.52 | 0.50 |
| DD[29] | 34.50 | 39.72 |
| DD[39] | 11.42 | 14.23 |

TABLE 12

EXAMPLE 4

| SURFACE NUMBER | 1 | 2 | 9 | 10 |
|---|---|---|---|---|
| KA  | −1.2640162E+00 | −7.3365099E+00 | 1.0000000E+00 | 1.0000000E+00 |
| A3  | 5.3061722E−04  | 9.0621521E−04  | −2.5081805E−20 | −3.5119979E−20 |
| A4  | 2.0369002E−05  | −1.6562035E−04 | −4.7075284E−05 | −3.3925760E−05 |
| A5  | −1.6527451E−06 | 3.4650488E−05  | 1.6708557E−06  | 2.1679638E−06 |
| A6  | 2.8887773E−08  | −4.9207893E−06 | 1.9774716E−07  | 5.4609570E−08 |
| A7  | 6.2350969E−10  | 4.8565327E−07  | −1.8219486E−08 | −1.2724556E−08 |
| A8  | −3.0247136E−11 | −3.4092899E−08 | −1.8790834E−10 | 2.5233532E−10 |
| A9  | 1.1421362E−13  | 1.7345319E−09  | 6.4060010E−11  | 2.7689601E−11 |
| A10 | 1.3578161E−14  | −6.4706067E−11 | −1.0221820E−12 | −9.7768428E−13 |
| A11 | −2.2447677E−16 | 1.7714618E−12  | −7.4466722E−14 | −1.9182451E−14 |
| A12 | −1.8977048E−18 | −3.5176297E−14 | 2.0827787E−15  | 8.4663049E−16 |
| A13 | 7.5253715E−20  | 4.9272727E−16  | | |
| A14 | −2.5787284E−22 | −4.6134183E−18 | | |
| A15 | −8.1128352E−24 | 2.5901460E−20  | | |
| A16 | 6.6878032E−26  | −6.5925358E−23 | | |

| SURFACE NUMBER | 21 | 22 |
|---|---|---|
| KA  | 1.0000000E+00  | 1.0000000E+00 |
| A3  | 2.0844424E−20  | 1.6633745E−19 |
| A4  | 3.7282001E−05  | 7.8128438E−05 |
| A5  | −9.4089621E−07 | −3.4489473E−06 |
| A6  | −3.4011984E−07 | −1.9113379E−07 |
| A7  | 1.7419040E−08  | 2.0913085E−08 |
| A8  | 1.3836119E−09  | 1.3729827E−10 |
| A9  | −1.1582117E−10 | −6.1124683E−11 |
| A10 | −3.0636255E−12 | 2.2273722E−13 |
| A11 | 3.9217310E−13  | 1.0821201E−13 |
| A12 | 2.1020871E−15  | −6.5341676E−16 |
| A13 | −7.4580103E−16 | −1.1225570E−16 |
| A14 | 3.4949792E−18  | 7.3424286E−19 |
| A15 | 7.6553360E−19  | 6.1741222E−20 |
| A16 | −4.4324163E−21 | −3.1426029E−22 |
| A17 | −3.2892041E−22 | −1.3768474E−23 |

Example 5

Figure 5:
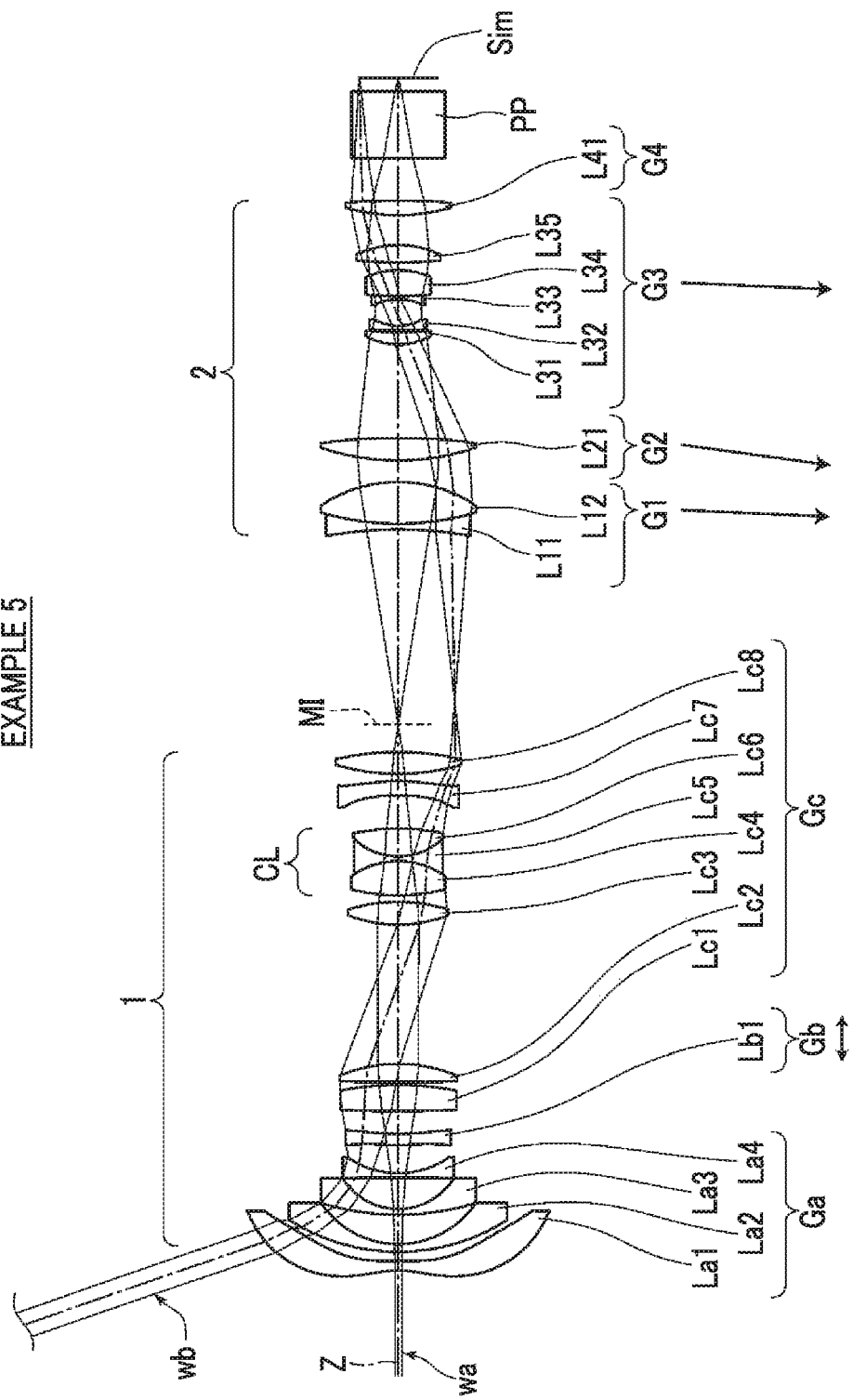
FIG. 5 is a cross-sectional view illustrating a configuration and an optical path of a zoom lens of Example 5 of the present invention.

FIG. 5 is a cross-sectional diagram of a lens configuration and an optical path of a zoom lens of Example 5. The zoom lens of Example 5 includes, in order from the magnification side, a first optical system 1 and a second optical system 2. The second optical system 2 forms an intermediate image MI at a position conjugate to an image display surface Sim, and the first optical system 1 causes the intermediate image MI to be re-imaged on a screen Scr. The first optical system 1 includes, in order from the magnification side, a front group Ga, an intermediate group Gb, and a rear group Gc. The second optical system 2 includes, in order from the magnification side, a first lens group G1, a second lens group G2, a third lens group G3, and a fourth lens group G4. Example 5 is different from Example 1 in that, during zooming, the fourth lens group G4 remains with respect to the reduction side imaging plane, and the first lens group G1, the second lens group G2, and the third lens group G3 move along respectively different loci. In FIG. 5, under each of three lens groups moving during zooming, a direction of moving each lens group during zooming from the wide-angle end to the telephoto end is schematically indicated by an arrow. The present example is the same as Example 1 in terms of the signs of refractive powers of the lens groups, the lens groups moving during focusing, and the number of lenses constituting each lens group.

Figure 10:
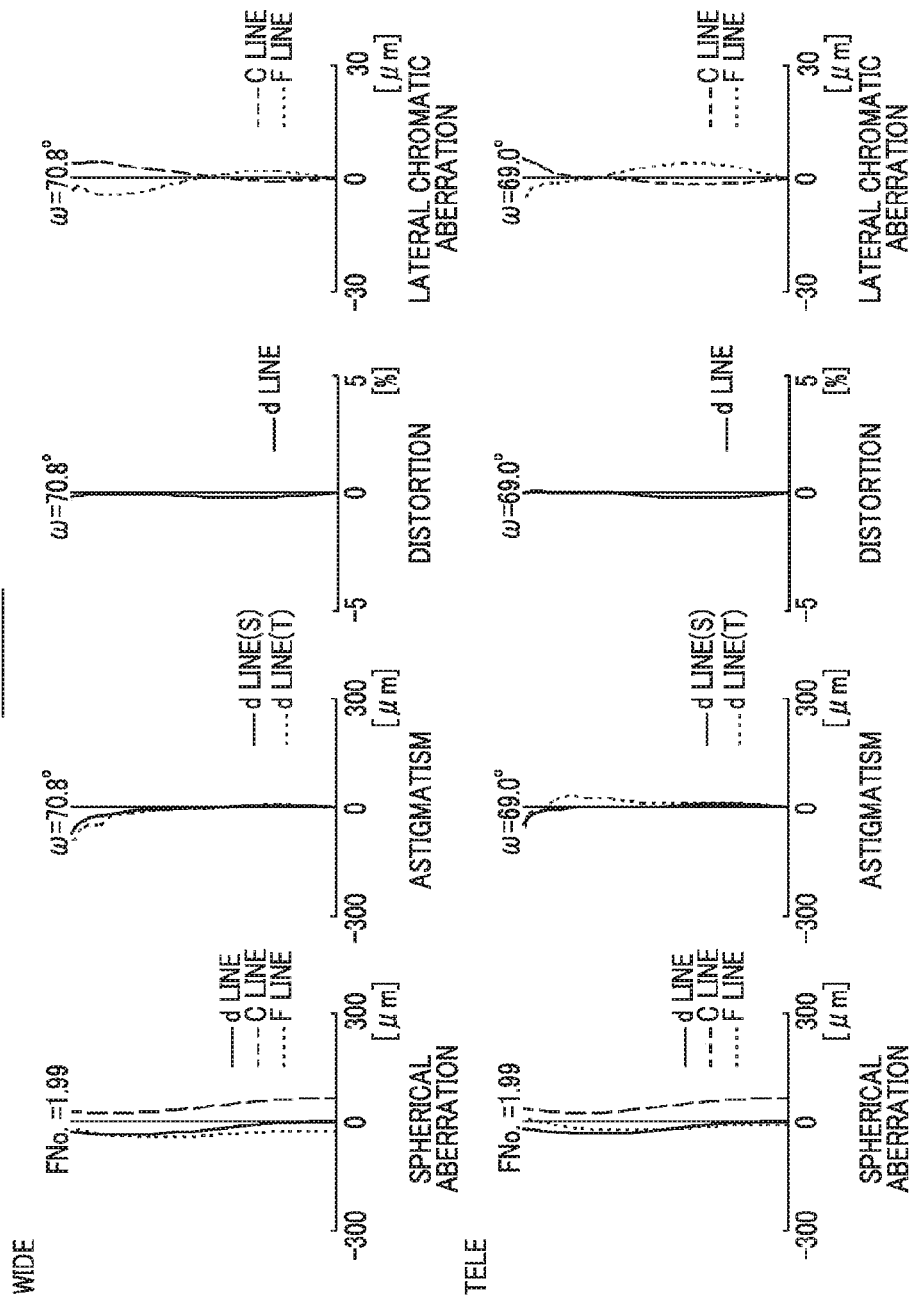
FIG. 10 is a diagram of aberrations of the zoom lens of Example 5 of the present invention.

Table 13 shows basic lens data of the zoom lens of Example 5. Table 14 shows various kinds of data, Table 15 shows aspheric coefficients, and FIG. 10 shows aberration diagrams.

TABLE 13

EXAMPLE 5

| Si | Ri | Di | Ndj | νdj |
|---|---|---|---|---|
| *1  | −27.2884   | 3.6011  | 1.49100 | 57.58 |
| *2  | −155.3057  | 3.3263  | | |
| 3   | 74.6884    | 2.9009  | 1.76450 | 49.10 |
| 4   | 34.6082    | 11.0325 | | |
| 5   | 97.0443    | 2.1007  | 1.83400 | 37.16 |
| 6   | 24.2838    | 11.8281 | | |
| 7   | −1215.4088 | 1.6000  | 1.76200 | 40.10 |
| 8   | 33.0191    | 10.6076 | | |
| *9  | 80.5414    | 4.1216  | 1.49100 | 57.58 |
| *10 | 62.4747    | 8.5693  | | |
| 11  | 710.6298   | 9.7672  | 1.74077 | 27.76 |
| 12  | −109.0430  | 1.0008  | | |
| 13  | 640.2342   | 6.8966  | 1.72047 | 34.71 |
| 14  | −55.7008   | 51.8063 | | |
| 15  | 51.0008    | 8.5860  | 1.53775 | 74.70 |
| 16  | −60.4841   | 2.4114  | | |
| 17  | 68.4386    | 12.8165 | 1.55352 | 71.72 |
| 18  | −29.7560   | 1.7552  | 1.80518 | 25.42 |
| 19  | 23.8559    | 10.4663 | 1.49700 | 81.54 |
| 20  | −76.5550   | 12.4259 | | |
| *21 | −58.2522   | 5.4379  | 1.49100 | 57.58 |
| *22 | −42.9387   | 2.5668  | | |
| 23  | 80.9403    | 8.1645  | 1.84666 | 23.78 |
| 24  | −103.9712  | DD[24]  | | |
| 25  | −152.2506  | 2.1518  | 1.80518 | 25.42 |
| 26  | 100.8349   | 15.6143 | 1.58144 | 40.89 |
| 27  | −51.5599   | DD[27]  | | |
| 28  | 88.1919    | 8.4662  | 1.79952 | 42.22 |
| 29  | −210.2631  | DD[29]  | | |
| 30  | 25.1055    | 4.5137  | 1.83481 | 42.72 |

TABLE 13-continued

EXAMPLE 5

| Si | Ri | Di | Ndj | vdj |
|---|---|---|---|---|
| 31 | 96.7719 | 0.7733 | | |
| 32 | 136.6727 | 1.7421 | 1.74000 | 28.30 |
| 33 | 17.9608 | 9.8264 | | |
| 34 | −21.3255 | 1.2133 | 1.84666 | 23.78 |
| 35 | 105.7060 | 9.7530 | 1.53775 | 74.70 |
| 36 | −28.7597 | 2.9745 | | |
| 37 | 207.9254 | 6.4159 | 1.53775 | 74.70 |
| 38 | −35.6901 | DD[39] | | |
| 39 | 70.9045 | 5.3780 | 1.89286 | 20.36 |
| 40 | −295.0634 | 16.0000 | | |
| 41 | ∞ | 25.0000 | 1.51633 | 64.14 |
| 42 | ∞ | | | |

TABLE 14

EXAMPLE 5

| | WIDE | TELE |
|---|---|---|
| Zr | 1.00 | 1.10 |
| \|f\| | 5.03 | 5.53 |
| FNo. | 1.99 | 1.99 |
| 2ω(°) | 141.6 | 138.0 |
| DD[24] | 83.73 | 82.73 |
| DD[27] | 8.06 | 1.03 |
| DD[29] | 34.69 | 39.01 |
| DD[39] | 11.20 | 14.91 |

TABLE 15

EXAMPLE 5

| SURFACE NUMBER | 1 | 2 | 9 | 10 |
|---|---|---|---|---|
| KA | −1.2734761E+00 | −7.3360927E+00 | 1.0000000E+00 | 1.0000000E+00 |
| A3 | 5.1985187E−04 | 9.0335021E−04 | 0.0000000E+00 | −2.3394386E−20 |
| A4 | 1.9763284E−05 | −1.6525091E−04 | −5.5062230E−05 | −4.3592243E−05 |
| A5 | −1.6305565E−06 | 3.4303311E−05 | 1.5439444E−06 | 2.1318397E−06 |
| A6 | 3.0348839E−08 | −4.8667707E−06 | 2.7013108E−07 | 1.2475666E−07 |
| A7 | 5.6305883E−10 | 4.7974067E−07 | −2.1089786E−08 | −1.5925957E−08 |
| A8 | −3.1108009E−11 | −3.3617036E−08 | −3.8242180E−10 | 8.0403955E−11 |
| A9 | 1.7790065E−13 | 1.7071769E−09 | 7.8171041E−11 | 4.2551823E−11 |
| A10 | 1.3532123E−14 | −6.3573147E−11 | −9.9972509E−13 | −9.9859665E−13 |
| A11 | −2.5759774E−16 | 1.7374002E−12 | −9.2538880E−14 | −3.8563402E−14 |
| A12 | −1.6410557E−18 | −3.4439180E−14 | 2.4215307E−15 | 1.2366715E−15 |
| A13 | 8.3622557E−20 | 4.8155210E−16 | | |
| A14 | −3.5608932E−22 | −4.5008505E−18 | | |
| A15 | −8.9313018E−24 | 2.5224419E−20 | | |
| A16 | 7.8602762E−26 | −6.4082871E−23 | | |

| SURFACE NUMBER | 21 | 22 |
|---|---|---|
| KA | 1.0000000E+00 | 1.0000000E+00 |
| A3 | 6.2076349E−20 | −1.2588447E−19 |
| A4 | 4.6376492E−05 | 8.1376411E−05 |
| A5 | −2.8424503E−06 | −3.9160856E−06 |
| A6 | −2.9868101E−07 | −2.2716575E−07 |
| A7 | 2.7173987E−08 | 2.3037679E−08 |
| A8 | 7.1065212E−10 | 2.3051617E−10 |
| A9 | −1.3454636E−10 | −6.5025147E−11 |
| A10 | 1.1031082E−13 | 1.3687379E−13 |
| A11 | 3.7863369E−13 | 1.0996107E−13 |
| A12 | −5.1328606E−15 | −6.6708372E−16 |
| A13 | −6.2878760E−16 | −1.0983060E−16 |
| A14 | 1.1557170E−17 | 8.0627956E−19 |
| A15 | 5.8558295E−19 | 5.9172521E−20 |
| A16 | −7.9407407E−21 | −3.4851250E−22 |
| A17 | −2.3636099E−22 | −1.3174650E−23 |

Table 16 shows values corresponding to the conditional expressions (1) to (14) of the zoom lenses of Examples 1 to 5, and values of Ymax. The values shown in Table 10 are based on the d line.

TABLE 16

| EXPRESSION NUMBER | | EXAMPLE 1 | EXAMPLE 2 | EXAMPLE 3 | EXAMPLE 4 | EXAMPLE 5 |
|---|---|---|---|---|---|---|
| (1) | Ymax/f2 | 0.1108 | 0.1159 | 0.1062 | 0.1110 | 0.1089 |
| (2) | Ymax/f1 | 1.8867 | 1.2086 | 1.8276 | 1.8953 | 1.8163 |
| (3) | Ymax/fG3 | 0.0090 | 0.0182 | 0.1943 | −0.0007 | 0.0299 |
| (4) | Mag2T/Mag2W | 1.101 | 1.025 | 1.103 | 1.100 | 1.117 |
| (5) | Mag3T/Mag3W | 0.999 | 1.024 | 0.997 | 1.000 | 0.993 |

TABLE 16-continued

| EXPRESSION NUMBER | | EXAMPLE 1 | EXAMPLE 2 | EXAMPLE 3 | EXAMPLE 4 | EXAMPLE 5 |
|---|---|---|---|---|---|---|
| (6) | ν1 − ν2 | 46.30 | 30.07 | 46.30 | 46.30 | 46.30 |
| (7) | ν3 − ν2 | 56.12 | 56.15 | 56.12 | 56.12 | 56.12 |
| (8) | Ymax/fc | −0.092 | 0.072 | −0.107 | −0.090 | −0.081 |
| (9) | Ymax/fc1 | 0.373 | 0.399 | 0.394 | 0.374 | 0.370 |
| (10) | Ymax/fc2 | −0.897 | −0.625 | −0.948 | −0.895 | −0.902 |
| (11) | Ymax/fc3 | 0.367 | 0.261 | 0.380 | 0.365 | 0.383 |
| (12) | Ymax/Rc 1 | 0.590 | 0.340 | 0.605 | 0.587 | 0.608 |
| (13) | (Mag2T/Mag2W)/Zm | 1.001 | 0.977 | 1.003 | 1.000 | 1.015 |
| (14) | (Mag3T/Mag3W)/Zm | 0.908 | 0.975 | 0.907 | 0.909 | 0.903 |
| | Ymax | 14.5 | 14.5 | 14.5 | 14.5 | 14.5 |

As can be seen from the above-mentioned data, each of the zoom lenses of Examples 1 to 5 is configured as a wide angle zoom lens to have a maximum total angle of view of 132° or more at the wide-angle end, has a small F number of less than 2.1, whereby aberrations are satisfactorily corrected, and high optical performance is achieved.

Figure 11:
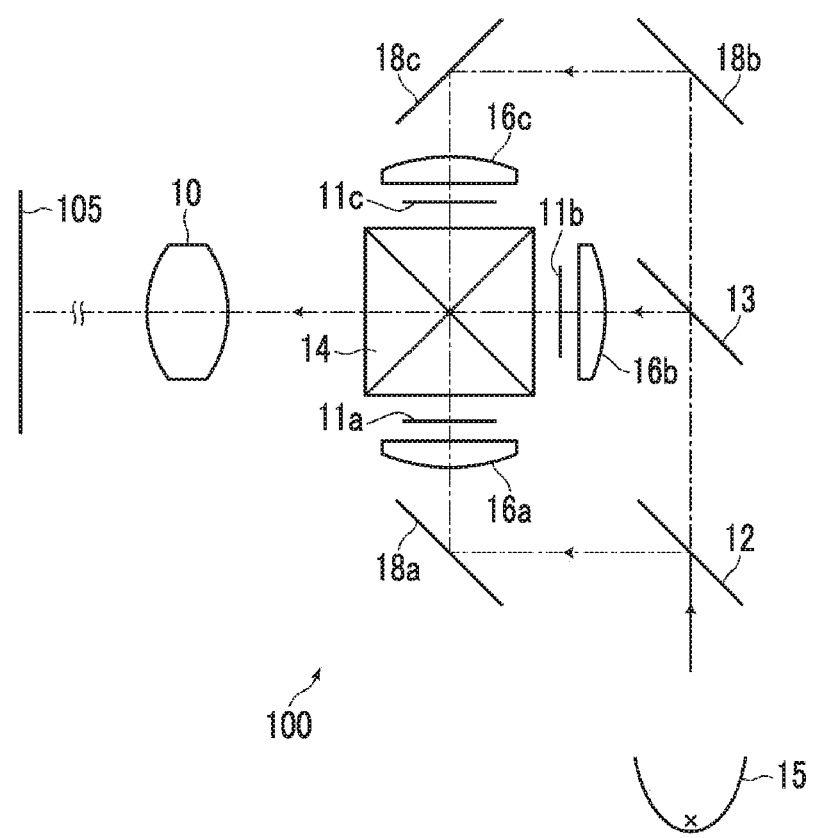
FIG. 11 is a schematic configuration diagram of a projection display device according to an embodiment of the present invention.

Next, a projection display device according to an embodiment of the present invention will be described. FIG. 11 is a schematic configuration diagram of the projection display device according to the embodiment of the present invention. The projection display device 100 shown in FIG. 11 has a zoom lens 10 according to the embodiment of the present invention, a light source 15, transmissive display elements 11a to 11c as light valves corresponding to respective color light beams, dichroic mirrors 12 and 13 for color separation, a cross dichroic prism 14 for color synthesis, condenser lenses 16a to 16c, and total reflection mirrors 18a to 18c for deflecting the optical path. In FIG. 11, the zoom lens 10 is schematically illustrated. Further, an integrator is disposed between the light source 15 and the dichroic mirror 12, but illustration thereof is omitted in FIG. 11.

White light originating from the light source 15 is separated into rays with three colors (G light, B light, R light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the zoom lens 10. The zoom lens 10 projects an optical image, which is formed by the light modulated through the transmissive display elements 11a to 11c, onto a screen 105.

Figure 12:
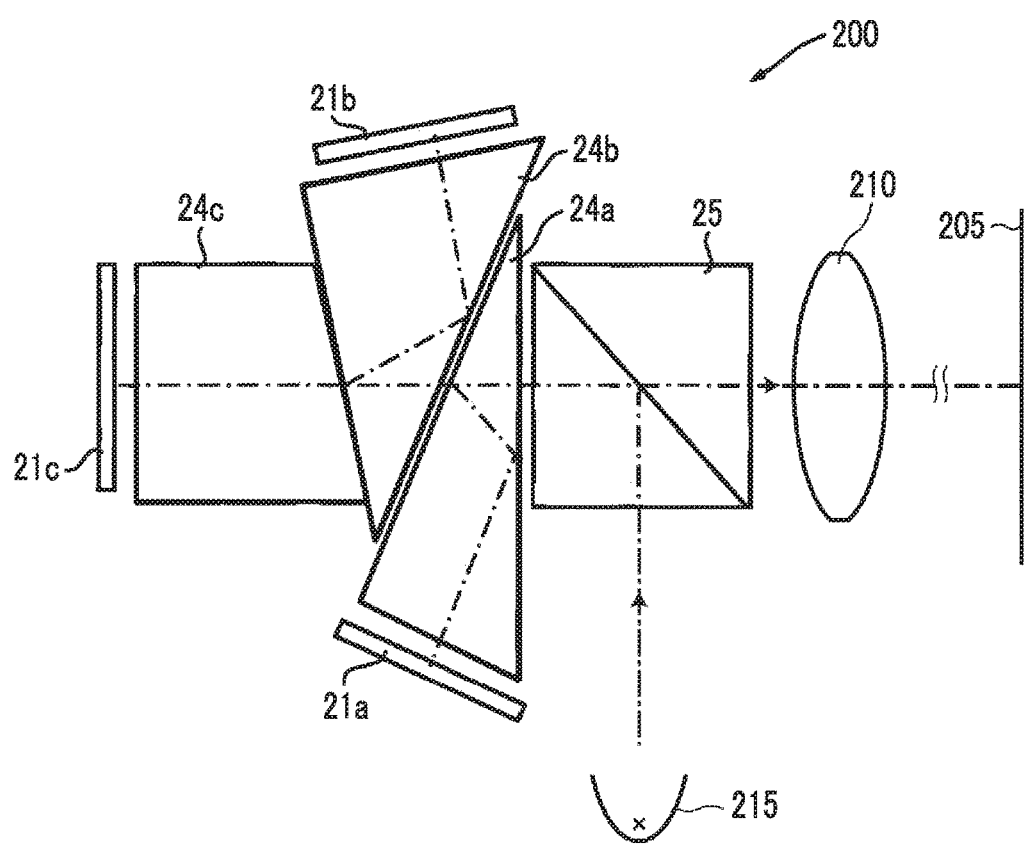
FIG. 12 is a schematic configuration diagram of a projection display device according to another embodiment of the present invention.

FIG. 12 is a schematic configuration diagram of a projection display device according to another embodiment of the present invention. The projection display device 200 shown in FIG. 12 has a zoom lens 210 according to the embodiment of the present invention, a light source 215, DMD elements 21a to 21c as light valves corresponding to respective color light beams, total internal reflection (TIR) prisms 24a to 24c for color separation and color synthesis, and a polarization separating prism 25 that separates illumination light and projection light. In FIG. 12, the zoom lens 210 is schematically illustrated. Further, an integrator is disposed between the light source 215 and the polarization separating prism 25, but illustration thereof is omitted in FIG. 12.

White light originating from the light source 215 is reflected on a reflective surface inside the polarization separating prism 25, and is separated into rays with three colors (G light, B light, R light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the zoom lens 210. The zoom lens 210 projects an optical image, which is formed by the light modulated through the DMD elements 21a to 21c, onto a screen 205.

Figure 13:
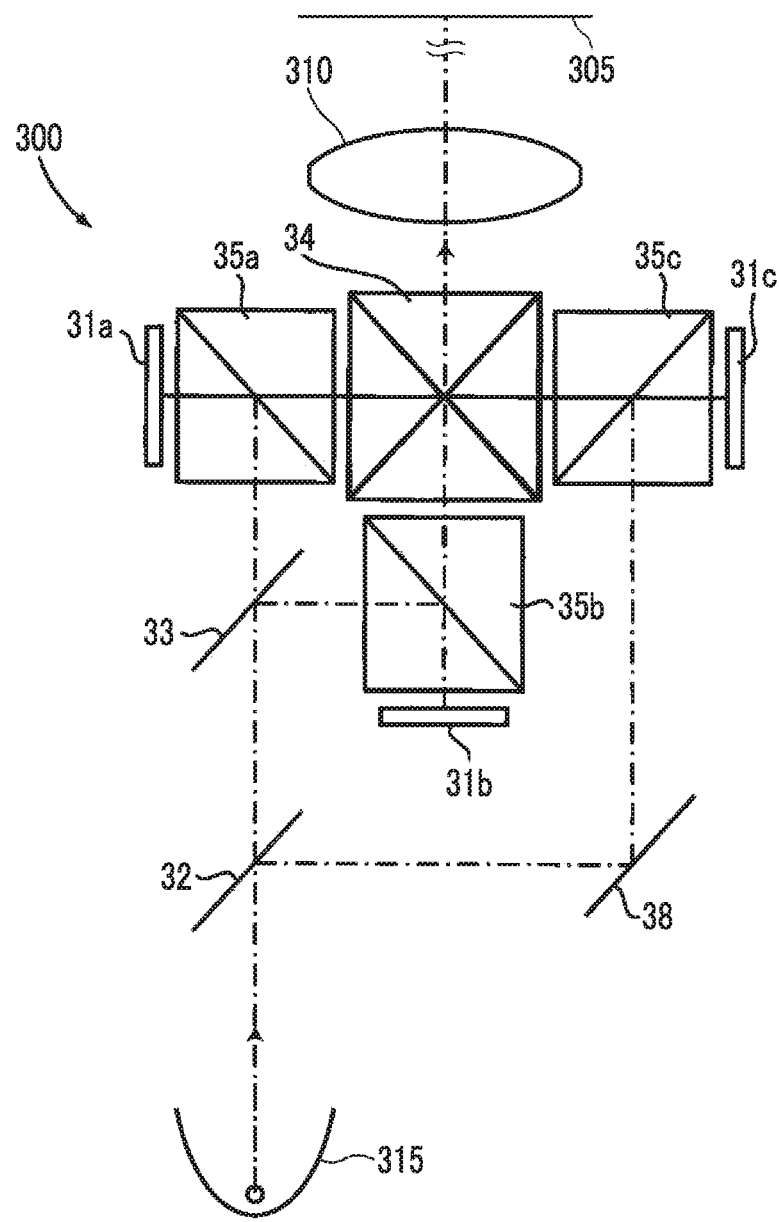
FIG. 13 is a schematic configuration diagram of a projection display device according to still another embodiment of the present invention.

FIG. 13 is a schematic configuration diagram of a projection display device according to still another embodiment of the present invention. The projection display device 300 shown in FIG. 13 has a zoom lens 310 according to the embodiment of the present invention, a light source 315, reflective display elements 31a to 31c as light valves corresponding to respective color light beams, dichroic mirrors 32 and 33 for color separation, a cross dichroic prism 34 for color synthesis, a total reflection mirror 38 for deflecting the optical path, and polarization separating prisms 35a to 35c. In FIG. 13, the zoom lens 310 is schematically illustrated. Further, an integrator is disposed between the light source 315 and the dichroic mirror 32, but illustration thereof is omitted in FIG. 13.

White light originating from the light source 315 is separated into rays with three colors (G light, B light, R light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the zoom lens 310. The zoom lens 310 projects an optical image, which is formed by the light modulated through the reflective display elements 31a to 31c, onto a screen 305.

Figure 14:
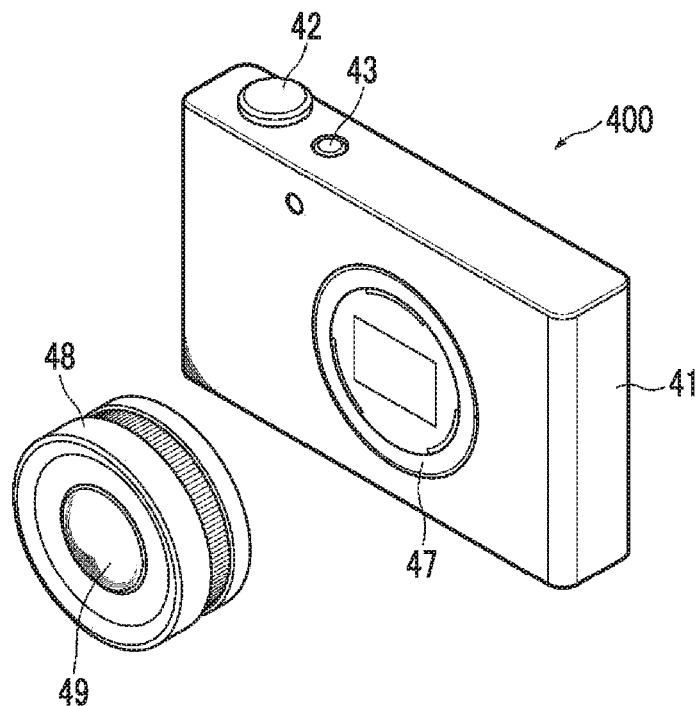
FIG. 14 is a perspective view of the front side of an imaging apparatus according to an embodiment of the present invention.
Figure 15:
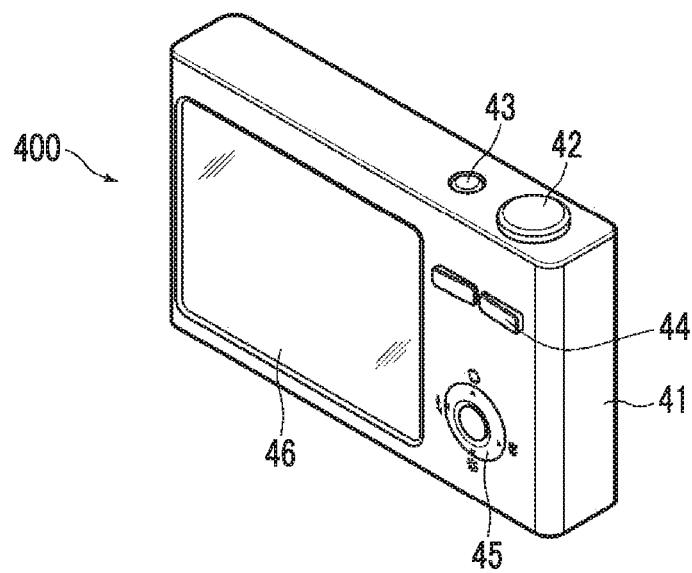
FIG. 15 is a perspective view of the rear side of the imaging apparatus shown in FIG. 14.

FIGS. 14 and 15 are external views of a camera 400 which is the imaging apparatus according to the embodiment of the present invention. FIG. 14 is a perspective view of the camera 400 viewed from the front side, and FIG. 15 is a perspective view of the camera 400 viewed from the rear side. The camera 400 is a single-lens digital camera on which an interchangeable lens 48 is detachably mounted and which has no reflex finder. The interchangeable lens 48 is configured such that a zoom lens 49 as the optical system according to the embodiment of the present invention is housed in a lens barrel.

The camera 400 comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image and an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a recording medium, and the like. The imaging element (not shown in the drawing) such as a charge coupled device (CCD) outputs a captured image signal based on a subject image which is formed through the interchangeable lens 48. The signal processing circuit generates an image through processing of the captured image signal which is output from the imaging element. The recording medium records the generated image. The camera 400 captures a still image or a moving image by pressing the shutter button 42, and records image data, which is obtained through imaging, in the recording medium.

The present invention has been hitherto described through embodiments and examples, but the present invention is not limited to the above-mentioned embodiments and examples, and may be modified into various forms. For example, values such as the radius of curvature, the surface spacing, the refractive index, the Abbe number, and the aspheric coefficient of each lens are not limited to the values shown in the numerical examples, and different values may be used therefor.

Further, the projection display device of the present invention is not limited to that of the above-mentioned configuration. For example, the used light valve and the optical member used in separation or synthesis of rays are not limited to those of the above-mentioned configuration, and may be modified into various forms.

Further, the imaging apparatus of the present invention is also not limited to the above-mentioned configurations. For example, the present invention may be applied to a single-lens reflex camera, a film camera, a video camera, and the like.

What is claimed is:

1. A zoom lens configured to form an intermediate image at a position conjugate to a reduction side imaging plane and configured to re-image the intermediate image on a magnification side imaging plane, the zoom lens consisting of, in order from the magnification side:
a first optical system; and
a second optical system,
wherein the second optical system is configured to position the intermediate image between the first optical system and the second optical system,
wherein the second optical system consists of, in order from the magnification side, a first lens group that has a positive refractive power, a second lens group that has a positive refractive power, a third lens group that has a positive or negative refractive power, and a fourth lens group that has a positive refractive power,
wherein during a zooming operation, the second lens group and the third lens group are configured to be movable to change spacings between the groups adjacent to each other in a direction of an optical axis, and the fourth lens group is configured to remain stationary with respect to the reduction side imaging plane, and
wherein Conditional Expression (1) is satisfied, $$0.095 < Y\text{max}/f2 < 0.15 \quad (1),$$

where Ymax is a maximum image height on the reduction side, and
f2 is a focal length of the second optical system at a wide-angle end.

2. The zoom lens according to claim 1, wherein Conditional Expression (2) is satisfied, $$1.1 < Y\text{max}/f1 < 2 \quad (2),$$

where Ymax is a maximum image height on the reduction side, and
f1 is a focal length of the first optical system at a wide-angle end.

3. The zoom lens according to claim 1, wherein Conditional Expression (3) is satisfied, $$-0.05 < Y\text{max}/fG3 < 0.2 \quad (3),$$

where Ymax is a maximum image height on the reduction side, and
fG3 is a focal length of the third lens group.

4. The zoom lens according to claim 1, wherein Conditional Expression (4) is satisfied, $$1 < \text{Mag2}T/\text{Mag2}W < 1.2 \quad (4),$$

where Mag2T is a lateral magnification of the second lens group at a telephoto end, and
Mag2W is a lateral magnification of the second lens group at a wide-angle end.

5. The zoom lens according to claim 1, wherein Conditional Expression (5) is satisfied, $$0.9 < \text{Mag3}T/\text{Mag3}W < 1.1 \quad (5),$$

where Mag3T is a lateral magnification of the third lens group at a telephoto end, and
Mag3W is a lateral magnification of the third lens group at a wide-angle end.

6. The zoom lens according to claim 1, wherein during a focusing operation, the second optical system is configured to remain stationary with respect to the reduction side imaging plane.

7. The zoom lens according to claim 6,
wherein the first optical system consists of, in order from the magnification side, a front group that has a negative refractive power, an intermediate group that has a negative refractive power, and a rear group that has a positive refractive power, and
wherein during a focusing operation, the intermediate group is configured to be movable to change spacings between the groups adjacent to each other in the direction of the optical axis.

8. The zoom lens according to claim 1, wherein during a zooming operation, the first optical system is configured to remain stationary with respect to the reduction side imaging plane.

9. The zoom lens according to claim 1, wherein the first optical system has three or more negative lenses continuously in order from a position closest to the magnification side.

10. The zoom lens according to claim 1, wherein the first optical system has three cemented lenses in which a positive lens, a negative lens, and a positive lens are cemented in order from the magnification side, and either of the two positive lenses within the three cemented lenses has an Abbe number at a d line larger than that of the negative lens within the three cemented lenses.

11. The zoom lens according to claim 10, wherein Conditional Expression (6) is satisfied, $$25 < v1 - v2 < 55 \quad (6),$$

where ν1 is an Abbe number of the positive lens on the magnification side within the three cemented lenses at the d line, and ν2 is an Abbe number of the negative lens within the three cemented lenses at the d line.

12. The zoom lens according to claim 10, wherein Conditional Expression (7) is satisfied, $$50 < \nu3 - \nu2 < 60 \tag{7}$$

where ν3 is an Abbe number of the positive lens on the reduction side within the three cemented lenses at the d line, and ν2 is an Abbe number of the negative lens within the three cemented lenses at the d line.

13. The zoom lens according to claim 10, wherein Conditional Expression (8) is satisfied, $$-0.25 < Y\text{max}/fc < 0.25 \tag{8}$$

where Ymax is a maximum image height on the reduction side, and fc is a focal length of the three cemented lenses.

14. The zoom lens according to claim 10, wherein Conditional Expression (9) is satisfied, $$0.1 < Y\text{max}/fc1 < 0.7 \tag{9}$$

where Ymax is a maximum image height on the reduction side, and fc1 is a focal length of the positive lens on the magnification side within the three cemented lenses.

15. The zoom lens according to claim 10, wherein Conditional Expression (10) is satisfied, $$-1 < Y\text{max}/fc2 < -0.4 \tag{10}$$

where Ymax is a maximum image height on the reduction side, and fc2 is a focal length of the negative lens within the three cemented lenses.

16. The zoom lens according to claim 10, wherein Conditional Expression (11) is satisfied, $$0.2 < Y\text{max}/fc3 < 0.45 \tag{11}$$

where Ymax is a maximum image height on the reduction side, and fc3 is a focal length of the positive lens on the reduction side within the three cemented lenses.

17. The zoom lens according to claim 10, wherein Conditional Expression (12) is satisfied, $$0.3 < Y\text{max}/Rc1 < 0.7 \tag{12}$$

where Ymax is a maximum image height on the reduction side, and

Rc1 is a radius of curvature of a cemented surface on the reduction side within the three cemented lenses.

18. A projection display device comprising:
a light source;
a light valve into which light originating from the light source is incident; and
the zoom lens according to claim 1, the zoom lens configured to project an optical image formed by light modulated through the light valve.

19. A zoom lens configured to form an intermediate image at a position conjugate to a reduction side imaging plane and configured to re-image the intermediate image on a magnification side imaging plane, the zoom lens consisting of, in order from the magnification side:
a first optical system; and
a second optical system,
wherein the second optical system is configured to position the intermediate image between the first optical system and the second optical system,
wherein the second optical system consists of, in order from the magnification side, a first lens group that has a positive refractive power, a second lens group that has a positive refractive power, a third lens group that has a positive or negative refractive power, and a fourth lens group that has a positive refractive power,
wherein the second lens group and the third lens group are configured to be movable to change spacings between the groups adjacent to each other in a direction of an optical axis, and the fourth lens group is configured to remain stationary with respect to the reduction side imaging plane, and
wherein Conditional Expression (3) is satisfied, $$-0.05 < Y\text{max}/fG3 < 0.2 \tag{3}$$

where Ymax is a maximum image height on the reduction side, and fG3 is a focal length of the third lens group.

20. An imaging apparatus comprising the zoom lens according to claim 19.

* * * * *